(12) United States Patent
Kobayashi et al.

(10) Patent No.: US 7,561,504 B2
(45) Date of Patent: *Jul. 14, 2009

(54) DATA REPRODUCING APPARATUS INCLUDING SUBSIGNAL GENERATED FROM ID INFORMATION

(75) Inventors: Seiji Kobayashi, Kanagawa (JP); Toshihiro Fujiki, Tokyo (JP)

(73) Assignee: Sony Corporation, Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 11/748,512

(22) Filed: May 15, 2007

(65) Prior Publication Data

US 2007/0211597 A1 Sep. 13, 2007

Related U.S. Application Data

(60) Continuation of application No. 11/471,598, filed on Jun. 21, 2006, which is a continuation of application No. 11/274,114, filed on Nov. 16, 2005, now Pat. No. 7,149,161, which is a continuation of application No. 10/424,733, filed on Apr. 29, 2003, now Pat. No. 6,996,042, which is a division of application No. 09/412,864, filed on Oct. 5, 1999, now Pat. No. 6,665,240.

(30) Foreign Application Priority Data

| Oct. 7, 1998 | (JP) | ................... P10-285516 |
| Nov. 24, 1998 | (JP) | ................... P10-332222 |
| Dec. 28, 1998 | (JP) | ................... P10-371795 |

(51) Int. Cl.
*G11B 15/52* (2006.01)
(52) U.S. Cl. .................. 369/47.19; 369/59.26
(58) Field of Classification Search ........... None
See application file for complete search history.

(56) References Cited

U.S. PATENT DOCUMENTS 5,400,319 A 3/1995 Fite et al.

(Continued)

FOREIGN PATENT DOCUMENTS

EP 0 580 873 A1 2/1994

(Continued)

OTHER PUBLICATIONS

U.S. Appl. No. 11/748,512, filed May 15, 2007, Kobayashi et al.

*Primary Examiner*—Paul Huber
(74) *Attorney, Agent, or Firm*—Oblon, Spivak, McClelland, Maier & Neustadt, P.C.

(57) ABSTRACT

Described herewith is an optical disk manufacturing apparatus for reading recorded digital data from an optical disk, comprising an encryption unit for encrypting entered digital data according to a plurality of key information; an optical disk substrate manufacturing unit for manufacturing an optical disk substrate on which the encrypted digital data and key information are recorded in the form of physical form changes; a reflection film forming unit for forming a reflection film on the optical disk substrate; and a key information recording unit for recording key information on the optical disk substrate on which the reflection film is formed. The reflection factor of the optical disk is changed locally, thereby giving a jitter to the position information of each pit edge, and desired data is recorded additionally according to this jitter. Pits, etc. are disposed so as to be deviated from the track center towards the inner/outer region of the optical disk, thereby recording such sub-data as key information KY, etc.

10 Claims, 17 Drawing Sheets

U.S. PATENT DOCUMENTS

| | | | |
|---|---|---|---|
| 5,696,757 | A | 12/1997 | Ozaki et al. |
| 5,724,327 | A | 3/1998 | Timmermans et al. |
| 6,078,552 | A | 6/2000 | Yamamoto et al. |
| 6,122,739 | A * | 9/2000 | Kutaragi et al. ............... 726/32 |
| 6,181,659 | B1 | 1/2001 | Kobayashi |
| 7,020,057 | B2 | 3/2006 | Kobayashi et al. |
| 7,149,162 | B2 | 12/2006 | Kobayashi et al. |
| 7,151,726 | B2 | 12/2006 | Kobayashi et al. |
| 7,154,823 | B2 | 12/2006 | Kobayashi et al. |

FOREIGN PATENT DOCUMENTS

| | | |
|---|---|---|
| EP | 0 703 576 A1 | 3/1996 |
| EP | 0 866 454 A2 | 9/1998 |
| EP | 1 054 395 A1 | 11/2000 |
| JP | 5-325193 | 12/1993 |
| JP | 07-037255 | 2/1995 |
| JP | 8-147704 | 6/1996 |
| JP | 09-091781 | 4/1997 |
| JP | 09-097216 | 4/1997 |
| JP | 09-245350 | 9/1997 |
| JP | 10-124931 | 5/1998 |
| JP | 10-188454 | 7/1998 |
| JP | 10-269577 | 10/1998 |
| JP | 10-320779 | 12/1998 |
| WO | WO 99/44196 | 9/1999 |

* cited by examiner

F I G. 2
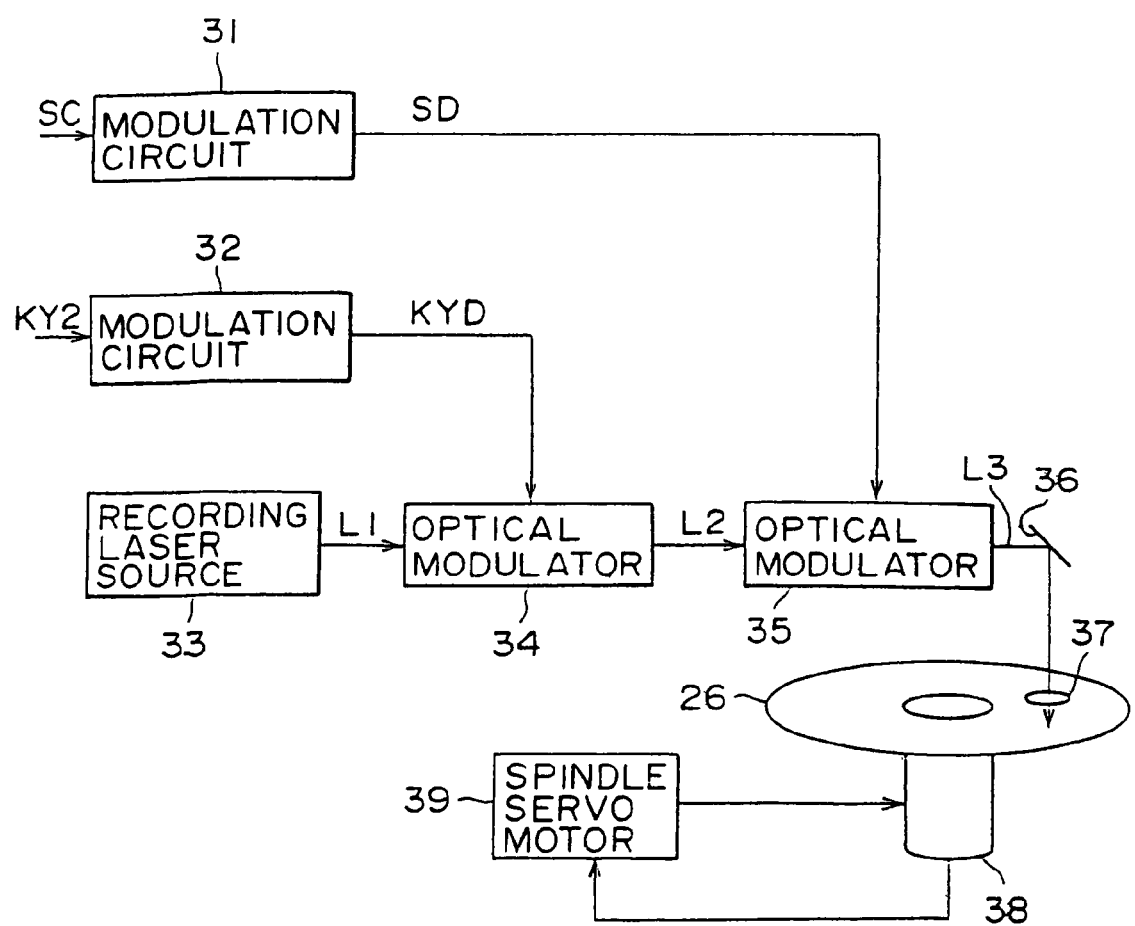

LI LEAD IN

DA DATA AREA   LO LEAD OUT

LI LEAD IN

DA DATA AREA

LO LEAD OUT

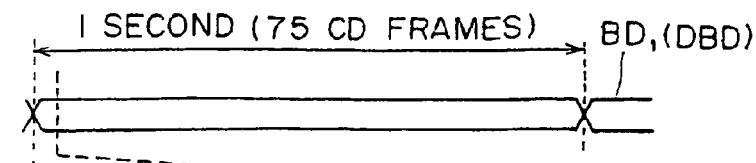
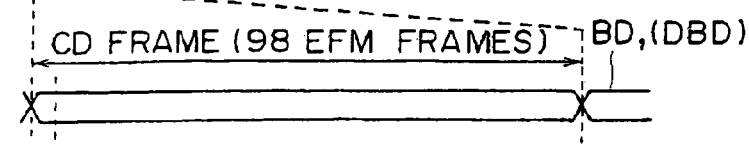
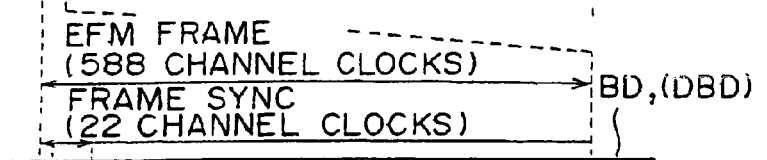
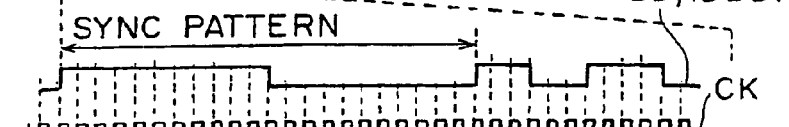
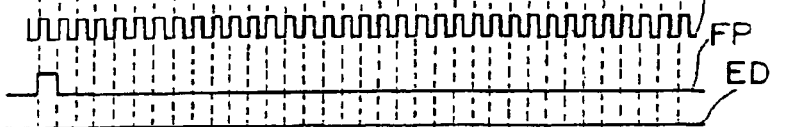
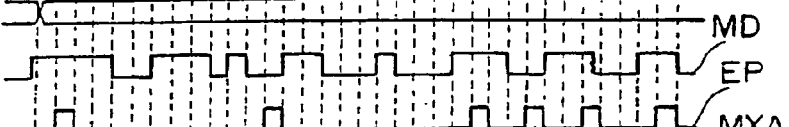
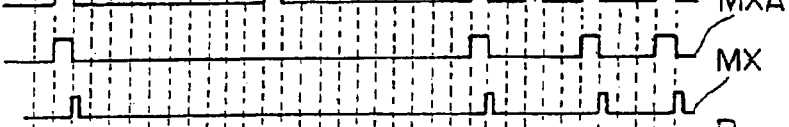
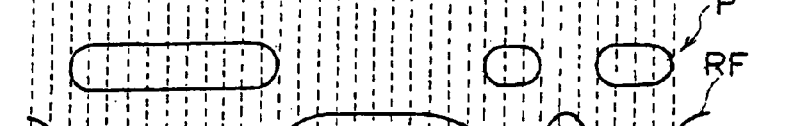
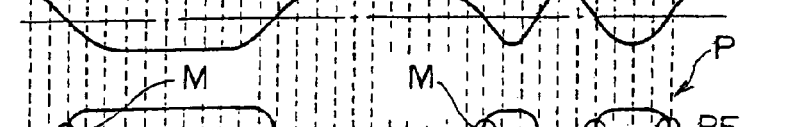
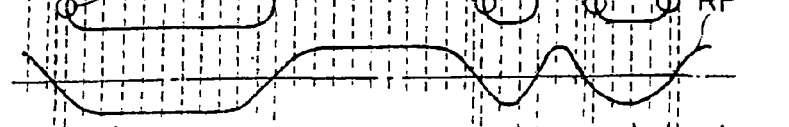
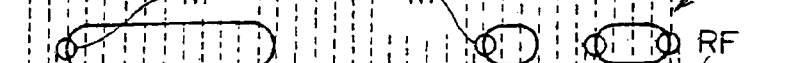

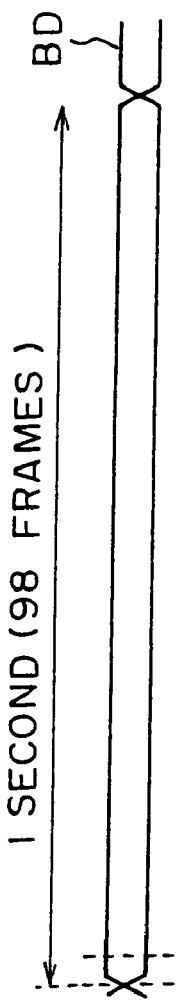
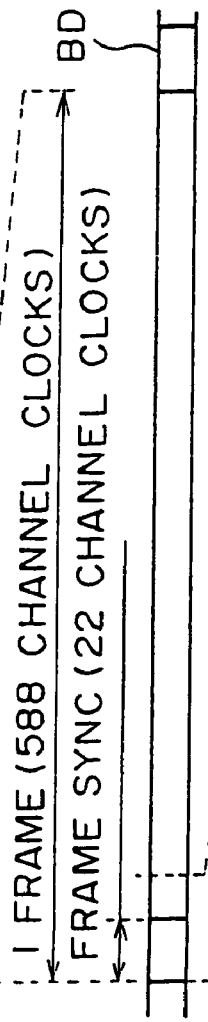
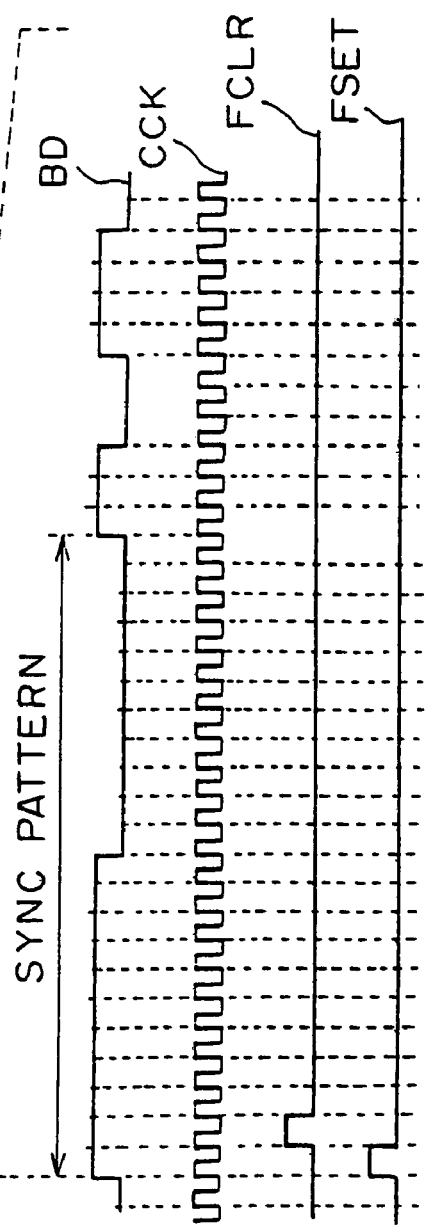
FIG.17A1
FIG.17A2
FIG.17A3
FIG.17B
FIG.17C
FIG.17D

DATA REPRODUCING APPARATUS INCLUDING SUBSIGNAL GENERATED FROM ID INFORMATION

CROSS-REFERENCE TO RELATED APPLICATIONS

This application is a continuation application of, and claims priority from, application Ser. No. 11/471,598 filed Jun. 21, 2006, which is a continuation of application Ser. No. 11/274,114, filed Nov. 16, 2005 now U.S. Pat. No. 7,149,161, which is a continuation of application Ser. No. 10/424,733 filed Apr. 29, 2003, now U.S. Pat. No. 6,996,042, which is a divisional application of application Ser. No. 09/412,864 filed Oct. 5, 1999, now U.S. Pat. No. 6,665,240, and claims priority to JP 10-285516 (Oct. 7, 1998), JP 10-332222 (Nov. 24, 1998) and JP 10-371795 (Dec. 28, 1998), the entire contents of each are hereby incorporated by reference.

BACKGROUND OF THE INVENTION

1. Field of the Invention

The present invention relates to an apparatus and a method for manufacturing an optical disk, an apparatus and a method for recording data on the optical disk, and an apparatus and a method for reproducing data from the optical disk, as well as the optical disk. For example, the present invention can apply to a compact disk, a compact disk player, an optical disk for recording audio data, and a recording apparatus and a reproducing apparatus usable for the optical disk.

The present invention changes the reflectance of the optical disk locally, thereby giving a jitter to the positional information of each pit edge, so that desired data is recorded on the optical disk additionally.

Consequently, various data can be the optical disk so as to be reproduced by an optical pickup for reproducing data strings and not to be copied illegally without any adverse effect on the reproduction of the data strings recorded in the from of pit strings.

In addition, the present invention deviates bits, etc. towards the inner/outer region of the optical disk, thereby recording such sub-data as key information, etc., so that various data can be recorded on the optical disk so as to be reproduced by an optical pickup for reproducing the data strings and not to be copied illegally without any adverse effect on the reproduction of the data strings recorded in the form of pit strings.

2. Description of the Related Art

In the case of conventional compact disks (CD), data strings to be recorded have been processed, then subjected to EFM modulation (Eight to Fourteen Modulation), thereby such data as audio data is recorded.

On the other hand, a management data recording area is formed in the lead-in area provided in the inner region of the optical disk and the TOC (Table Of Contents) recorded in this recording area is used to selectively reproduce desired musical performance data, etc.

A compact disk having various recorded data as described above is provided with a recording area for the IFPI (International Federation of the Photographic Industry) code in an inner area of the lead-in area, where such signals as audio signals and the TOC (Table Of Contents) used by the object user are recorded. This area also has such inscription codes as factory name, the disk number, etc., with which the history of the compact disk can be checked visually.

By the way, such the inscription data as a maker name, a factory name, a disk number, etc. are enscrolled on each compact disk so that the history of the compact disk is checked visually and such the inscription data is used for discriminating illegally copied disks manufactured from an original disk. However, because such the inscription data is recorded so as to be checked visually, the inscription data arises a problem that the data cannot be reproduced easily by an optical pickup of the compact disk player. In order to solve this problem, therefore, a reproducing mechanism is required dedicatedly for reproducing the inscription data while it is enabled to discriminate this inscription data from illegally copied disks.

The inscription data to be recorded with those methods is recorded in the form of pits ordinarily and checked visually, if it can be duplicated by, for example, creating a stamper by peeling both protection film and aluminum reflection film from the object compact disk. And, this is why the compact disk cannot be protected from illegal copying.

To solve the above-mentioned problems, for example, Japanese Patent Laid-Open No. 9-67843 discloses a method in which the output of a recording laser is varied to change the pit width recorded on the disk, thereby recording the inherent code on the disk.

For example, as the first example, there is a well-known method in which a recording signal on a disk is encrypted and key information for decryption is recorded as a variation of the pit width according to the method described in the above-mentioned patent application. A reproducing apparatus is composed so that the key information recorded as described above is detected and the cryptogram is decrypted according to the detected key information. Because the key information is not recorded on the pirated disk, the cryptogram is therefore not decrypted and the content of the disk is not reproduced normally. Therefore, if a reproducing apparatus is composed as described above, then the pirated disk becomes useless, thereby the pirated copy is substantially prevented.

Now, there are two well-known methods for making a pirated disk; a method in which reproduced signal from a disk is supplied to a recording unit as is and the other method in which the physical configuration of a disk is transferred as is. If a disk which is manufactured according to the above-mentioned first example is used for making a pirated disk according to the method in which the reproduced signal is supplied to a recording unit as is, then the key information recorded in the form of pit width change is not recorded on the pirated disk though the information recorded in the form of "pit/no pit" change is recorded in the pirated disk. Therefore it is possible to prevent making of a pirated disk according to the method in which the reproduced signal is supplied to a recording unit as is by employing the method described in the first example. However, if a disk which is manufactured according the above-mentioned first example is used for making a pirated disk according to the method in which the physical configuration of a disk is transferred, then the key information recorded in the form of pit width change is also copied to a pirated disk. Therefore, the first example method is disadvantageous in that making of a pirated disk according to physical transfer can not be prevented.

Now, the second example is known as a method for solving such a problem. In the second example, the key information is recorded not in the form of physical configuration but in the form of reflectance change. In detail, a groove is formed on an area such as the lead-out area of an optical disk, an intensive laser beam is irradiated onto the reflection film of this area, thereby changing the reflection characteristic, and the same information as that of a bit string is recorded.

If the key information is recorded in the form of reflectance change, the key information is recorded in the form of reflection characteristic change of a reflection film. Because the key information is not recorded in the form of physical configuration (pit), the key information will not be copied on the pirated disk which is made according to physical transfer. Therefore, this method complements the disadvantage of the first example, and it is possible to prevent the making of the pirated disk by the use of the method according to physical transfer.

However, the second example is also disadvantageous in that if a pirated disk is made according to the method in which the reproduced signal is supplied to a recording unit as is, the key information recorded on the lead-out area is copied as is.

As described above, the respective methods for preventing the pirated disk which is proposed are effective only on either of the two methods for making a pirated disk herein addressed. Furthermore, if a pirated optical disk is made according to a method not described above, these methods are entirely not effective.

Under such the circumstances, it is an object of the present invention to provide an apparatus and a method for manufacturing an optical disk from which no pirated optical disk can be produced by any of a method in which the reproduced signal is supplied directly to a recording unit and a method in which the configuration of the optical disk is transferred physically, thereby eliminating the disadvantage of the conventional pirated copying method, and an optical disk to which such pirated copy prevention is applied and a method for reproducing an optical disk to which such pirated copy prevention is applied.

Besides that, it will also be possible to reject an illegal copy with the use of this data if various data can be recorded so as to be reproduced with an optical pickup for reproducing audio data and to be difficult to copy illegally without any adverse effect on the reproduction of audio data as pit strings.

SUMMARY OF THE INVENTION

It is therefore another object of the present invention to provide an optical disk, an optical disk recording unit, an optical disk recording method, an optical disk reproducing apparatus, and an optical disk reproducing method which can record various data for inhibiting illegal copying so as to be reproduced with an optical pickup for reproducing data recorded in the form of a pit string, etc. and to be difficult to copy illegally without any adverse effect on the reproduction of data recorded in the format of a pit string, etc.

In order to solve the above conventional problems, an optical disk manufacturing apparatus in accordance with the first present invention for manufacturing an optical disk having recorded digital data to be read out by irradiation of a laser beam comprises an encryption unit for encrypting input digital data according to a plurality of key information, an optical disk substrate manufacturing machine for manufacturing an optical disk substrate on which the encrypted digital data and the key information are recorded in the form of physical configurational change, a reflection film forming unit for forming a reflection film on the optical disk substrate, and a key information recording unit for recording the key information on the optical disk substrate having the reflection film thereon.

According to such the first present invention, the encryption unit encrypts input digital data according to a plurality of key information, the optical disk substrate manufacturing unit manufactures an optical disk substrate on which encrypted digital data and key information are recorded in the form of physical configurational change, the reflection film forming unit forms a reflection film on the optical disk substrate, and the key information recording unit records the key information on the optical disk substrate on which the reflection film is formed.

The first present invention provides an optical disk manufacturing apparatus for manufacturing an optical disk having recorded digital data to be read out by irradiation of a laser beam comprising an encryption unit for encrypting input digital data according to a plurality of key information, an optical disk substrate manufacturing machine for manufacturing an optical disk substrate on which the encrypted digital data and the key information are recorded in the form of physical configurational change, a reflection film forming unit for forming a reflection film on the optical disk substrate, and a key information recording unit for recording the key information on the optical disk substrate having the reflection film thereon.

The second present invention provides the optical disk manufacturing apparatus, wherein the optical disk substrate manufacturing unit comprises an exposing unit for converging a laser beam on an optical disk according to the encrypted digital data and the key information to expose the optical master disk, a stamper forming unit for forming a stamper by applying a chemical treatment on the exposed optical master disk, thereby changing the physical configuration thereof, and a duplication unit for transferring the physical configurational change on the stamper, thereby generating a plurality of optical disk substrates.

The third present invention provides the optical disk manufacturing apparatus, wherein the exposing unit comprises a laser beam intensity modulation unit for modulating the intensity of the laser beam according to the encrypted digital data, and a laser beam convergent position changing unit for changing the convergent position of the laser beam according to the key information.

The fourth present invention provides the optical disk manufacturing apparatus, wherein the laser beam intensity changing unit comprises a modulation unit for generating a modulated signal according to the encrypted digital data, and an optical modulation unit for controlling the on/off of the laser beam according to the modulated signal.

The fifth present invention provides the optical disk manufacturing apparatus, wherein the key information recording unit comprises a laser beam generation unit for generating a laser beam, an optical intensity modulation unit for modulating the laser beam according to the key information, and a converging unit for converging and irradiating the modulated laser beam on a predetermined position on the optical disk.

The sixth present invention provides an optical disk manufacturing method for manufacturing an optical disk having recorded digital data to be read out by irradiating a laser beam comprising an encryption step for encrypting input digital data according to a plurality of key information, an optical disk substrate manufacturing step for manufacturing optical disk substrates on which the encrypted digital data and the key information are recorded in the form of physical configurational change, a reflection film forming step for forming a reflection film on the optical disk substrate, and a key information recording step for recording the key information on the optical disk substrate on which the reflection film is formed.

The seventh present invention provides the optical disk manufacturing method described above, wherein the optical disk substrate manufacturing step comprises an exposing step for converging a laser beam on an optical disk according to the encrypted digital data and the key information to expose the optical master disk, a stamper forming step for forming a stamper by applying a chemical treatment on the exposed optical master disk to change the physical configuration thereof, and a duplication step for transferring the physical configurational change on the stamper, thereby generating a plurality of optical disk substrates.

The eighth present invention provides the optical disk manufacturing method described above, wherein the key information recording step comprises a laser generating step for generating a laser beam, a modulation step for modulating the laser beam according to the key information, and a laser irradiation step for converging and irradiating the laser beam on the optical disk substrate.

The ninth present invention provides an optical disk having digital data recorded in the form of physical configurational change, which is composed so as to reproduce digital data by reflecting an incident laser beam from its reflection film, wherein the digital signal is encrypted according to a plurality of key information, one of the plurality of key information is recorded on the optical disk in the form of physical configurational change, and at least one of the plurality of key information is recorded in the form of reflectance change of the reflection film on the optical disk.

The tenth present invention provides an optical disk reproducing method for reproducing an optical disk having recorded encrypted digital data, wherein the method comprises the first reproducing step for reproducing the first key information recorded on the optical disk in the form of physical configurational change, the second reproducing step for reproducing the second key information recorded on the optical disk in the form of reflectance change, and a decryption step for reproducing the digital data recorded on the optical disk and decrypting the reproduced digital data by use of the first and second key information.

In the eleventh present invention applied to an optical disk apparatus or optical disk recording method, the beam intensity of a recording laser beam irradiated onto an optical disk is raised intermittently according to the edge detection result and the recording signal to locally change the reflectance of the optical disk, thereby the timing when the reflecting beam reception result crosses the predetermined reference level is changed.

In the present invention applied to an optical disk, the reflectance changes locally so that a jitter is given to the reflected beam reception result obtained by scanning the laser beam on pits or marks, and additional data is recorded according to the local reflectance change.

The beam intensity of the recording laser beam irradiated onto the optical disk is raised intermittently to locally change the reflectance of the optical disk and the timing when the reflected beam reception result crosses the predetermined reference level is changed, thereby the additional data is reproduced so that the optical disk is not copied illegally, the additional data such as disk discrimination code is recorded, and the additional data is reproduced by processing the reproduction signal for reproduction without any adverse effect on the reproduction of the data recorded in the form of pit or mark pattern.

In the present invention applied to an optical disk, the reflectance is locally changed so as to give a jitter to the reflected beam reception result obtained by scanning a laser beam on pits or marks, and the additional data is recorded according to the local reflectance change, thereby the additional data is reproduced so that the optical disk is not copied illegally, the additional data such as disk discrimination code is recorded, and the additional data is reproduced by processing the reproduction signal for reproduction without any adverse effect on the reproduction of the data recorded in the form of pit or mark pattern.

When applied to an optical disk apparatus or an optical disk recording method, the main modulation signal is generated according to the main data, and the laser beam is irradiated on the optical disk according to this main modulation signal, thereby forming a pit string or a mark string thereon and sub-data is generated according to the sub-data, thereby generating the sub-modulation signal and the irradiation point of the laser beam is deviated towards the inner/outer region of the optical disk according to this sub-modulation signal.

Furthermore, according to the present invention, when applied to an optical disk, if the main data is recorded according to the length of a pit or mark and the interval between pits or marks along the track, then sub-data is recorded according to the deviation of the pit or mark towards the inner/outer region from the center of the track.

Furthermore, when applied to an optical disk apparatus, the deviation detection signal is output, then processed with reference to the reproduction signal, thereby reproducing the sub-data recorded in the form of a deviation of the pit or mark towards the inner/reference region of the optical disk with reference to the center of the track. The signal level of the deviation detection signal is changed according to the deviation of a pit or mark towards the inner/outer region of the optical disk from the center of the track.

When applied to an optical disk reproducing method, the main data recorded in the form of a pit string or a mark string is reproduced with the reflected beam of the laser beam irradiated on the optical disk and the recorded sub-data is reproduced in the form of a deviation of the pit or mark towards the inner/outer region from the center of the track with the same reflected laser beam.

If the main modulation signal is generated according to the main data and a pit string or a mark string is formed with the laser beam irradiated according to this main modulation signal, and the sub-modulation signal is generated according to sub-data and the irradiation point of the laser beam is deviated according to this sub-modulation signal towards the inner/outer region of the optical disk, then the sub-data can be recorded with the selection of this deviation in the inner/outer region so as not to disturb the reproduction of the main data recorded in the form of pits or marks. The sub-data can also be recorded so as to be prevented from illegal copying and reproduced with an optical pickup for reproducing the main data together with the assignment of various data for inhibiting illegal copying, etc.

If the main data is recorded according to the length of a pit or a mark and the interval between pits or marks along the track and sub-data is recorded in the form of a deviation of pits or marks towards the inner/outer region of the optical disk with reference to the center of the track, then the main data can be reproduced correctly with the selection of this deviation of the pit or mark towards the inner/outer region of the optical disk. In addition, the sub-data can be recorded so as to be difficult to copy illegally and to be reproduced with an optical pickup for reproducing the main data together with the assignment of various data for inhibiting illegal copying, etc.

If the deviation detection signal is output and processed with reference to the reproduction signal, thereby the recorded sub-data is reproduced according to the deviation of the pit or mark to the inner/outer region of the optical disk with reference to the center of the track, the main data recorded as a pit string or mark string can be reproduced from an optical disk composed as described above, as well as the sub-data recorded in the form of a deviation of pits or marks towards the inner/outer region of the optical disk can be reproduced from the same optical disk. The level of the deviation detection signal is changed according to the deviation of the pit or mark towards the inner/outer region of the optical disk with reference to the center of the track.

Furthermore, according to the configuration of the optical disk reproducing method, if the main data recorded in the form of a pit string or a mark string is reproduced with the reflected beam of the laser beam irradiated on the optical disk and the sub-data recorded in the form of a deviation of pits or marks towards the inner/outer region of the optical disk with reference to the center of the track is reproduced with the same reflected beam of the laser beam, then both main and sub-data can be reproduced from an optical disk having various recorded data for inhibiting illegal copying so as to be reproduced with an optical pickup for reproducing data recorded in the form of a pit string, etc. and to be difficult to copy illegally.

BRIEF DESCRIPTION OF THE DRAWINGS

FIG. 2 is a block diagram for a cutting machine provided for the apparatus for manufacturing optical disks shown in FIG. 1.

FIGS. 8A-1 to 8J-2 are a timing chart for the operation of the optical disk shown in FIG. 6.

FIGS. 14A through 14E-2 are timing charts for the operation of the key modulation circuit shown in FIG. 13.

FIGS. 17A1 through 17D are timing charts for the operation of the key modulation circuit shown in FIG. 16.

DESCRIPTION OF THE PREFERRED EMBODIMENTS (1-1) Configuration in an Embodiment Hereunder, an apparatus and a method for manufacturing optical disks, and an optical disk in accordance with an embodiment of the present invention will be described in detail with reference to the accompanying drawings.

Figure 1:
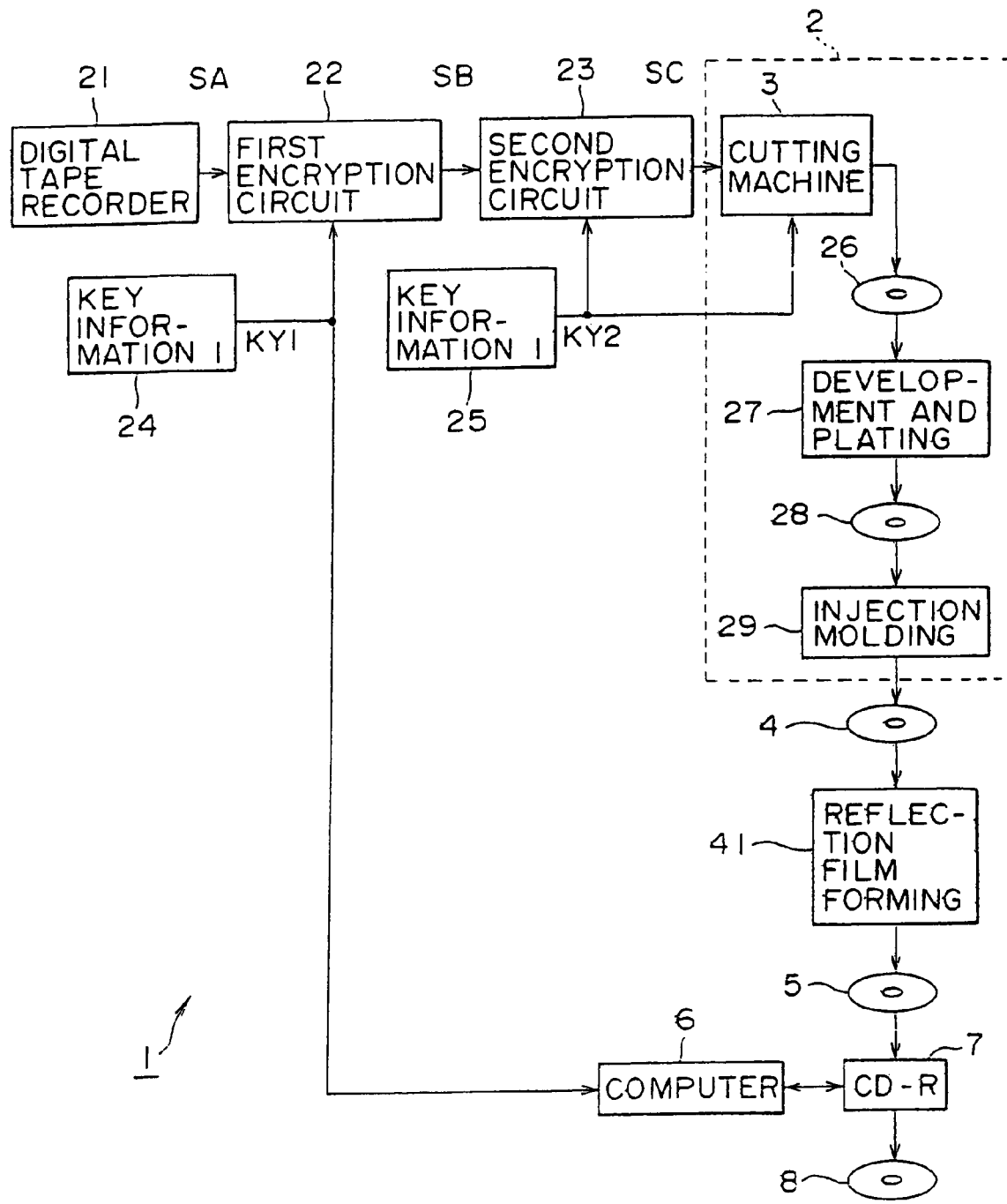
FIG. 1 is a block diagram for an example of an apparatus for manufacturing optical disks in accordance with an embodiment of the present invention.

First, an apparatus and a method for manufacturing an optical disks in accordance with an embodiment of the present invention will be described with reference to FIG. 1. The apparatus for manufacturing optical disks in this embodiment is an apparatus for manufacturing compact disks (CD). In FIG. 1, the digital audio signal SA reproduced from a magnetic tape by a digital tape recorder 21 is supplied to the first encryption circuit 22, and encrypted according to a first key information signal KY1 supplied from the first key information generation circuit 24. The encrypted digital audio signal SB supplied from the first encryption circuit 22 is supplied to the second encryption circuit 23 and encrypted according to a second key information signal supplied from the second key information generation circuit 25. The double-encrypted digital audio signal SC supplied from the second encryption circuit 23 and the second key information signal KY2 supplied from the second key information generation circuit 25 are supplied to an disk substrate manufacturing unit 2, and a disk substrate on which the double-encrypted digital audio signal SC and the second key information signal KY2 are recorded in the form of convex-concave pits is manufactured.

In the cutting machine 3 provided for the disk substrate manufacturing unit 2, a laser beam is modulated by the use of the double-encrypted audio signal SC supplied from the second encryption circuit 23 and the second key information signal KY2 supplied from the second key information generation circuit 23, and a master disk 26 is exposed to the modulated laser beam.

The exposed master disk 26 is subjected to developing process and plating process through a developing and plating unit 27, thereby obtaining a stamper 28. The stamper 28 is set on an injection molding machine 29, and a disk substrate 4 formed of plastic material such as polycarbonate is molded by the injection molding machine 29. On the disk substrate 4 formed as described above, the double-encrypted digital audio signal SC and the key information signal KY2 are recorded in the form of very small convex-concave (pit).

Next, a reflection film is formed on the disk substrate 4 by the reflection film forming unit 41, thereby obtaining a half-finished disk 5. On the half-finished disk 5, the double-encrypted digital audio signal SC and the second key information signal KY2 supplied form the second key information generation circuit 25 are recorded in the form of concave-convex pit, and the reflection film for reflecting a laser beam is formed on the opposite side of the pit. However, the first key information signal KY1 generated from the first key information generation circuit 24 is not recorded on the half-finished disk 5. Accordingly, it is impossible to reproduce the recorded music because the encryption by the first encryption circuit 22 cannot be decrypted as is when the half-finished disk 5 is loaded into an optical disk player.

Finally, the half-finished disk 5 is loaded into a CD-R recording unit 7. In the CD-R recording unit 7, the first key information signal KY1 supplied from the first key information generation circuit 24 is supplied to a computer 6, the area (lead-out area) where the user data is not recorded receives an access in response to a command from the computer 6, and the first key information signal KY1 supplied from the first key information generation circuit 24 is recorded additionally. The information signal recorded additionally by the CD-R recording unit 7 is recorded in the form of reflectance change of the reflection film formed by the reflection film forming unit.

On the compact disk (completed disk) 8 completed as described above, the second key information signal KY2 from the second key information generation circuit 25 and the first key information signal KY1 from the first key information generation circuit 24 are recorded in addition to the reproduced digital audio signal SA obtained from the digital tape recorder 21. When music data or the like recorded on the compact disk 8 is reproduced by an optical disk reproducing apparatus described hereinafter, it is possible to obtain the first key information signal KY1 and the second key information signal KY2 from the compact disk 8, the double encryption can be decrypted, and a user can enjoy the music in the same manner as in the case of a conventional compact disk.

The first encryption circuit 22 encrypts the digital audio signal SA according to the first key information signal KY1 generated from the first key information generation circuit 24 according to a DES code, and generates it as an encrypted digital audio signal SB. By the way, the DES code is the abbreviation of Data Encryption Standard. It is an encryption method which is used widely. Similarly, the second encryption circuit 23 encrypts the encrypted digital audio signal SB according to the second key information signal KY2 generated from the second key information generation circuit 25 according to he DES code, and generates it as a double-encrypted digital audio signal SC.

The first key information generation circuit 24 and the second key information generation circuit 25 generate the first key information signal KY1 and the second key information signal KY2 each time a new disk is cut. It has been known that a circuit for generating such a key information signal is composed of, for example, an LFSR (Linear Feedback Shift Register).

Next, the configuration of the cutting machine 3 shown in FIG. 1 will be described with reference to FIG. 2. The cutting machine 3 is used for recording the double-encrypted digital audio signal SC and the second key information signal KY2 on the master disk 26 with the laser beam exposed as described above. A modulation circuit 31 processes the double-encrypted digital audio signal SC in the data process specified for the compact disk, thereby generating an EFM signal SD and outputs it to an optical modulator 35. Further in detail, the double-encrypted digital audio signal SC is added with an error correction signal, and then subjected to interleave process and then to EFM modulation so as to generate an EFM signal SD. The modulation circuit 31 inserts subcode data including TOC (Table of Contents) supplied from a subcode generator not shown in the drawing in the subcode area of the EFM signal SD.

The modulation circuit 32 FM-modulates the second key information signal KY2 and outputs it to the optical modulator 34 as an analog wave key information modulation signal KYD. The FM modulation involves the same principle as used for recording the address information of an optical disk, for example, an MD (mini disk), and the detailed description is omitted. In the FM modulation, a clock signal or the like is embedded so that, for example, the key information signal KY2 is restored from the key information modulation signal KYD.

The modulation circuit 32 is set by a system controller not shown in the drawing so as to be operated only while the cutting machine 3 is operated for recording on the lead-in area. Therefore, the key information modulation signal KYD remains at a constant voltage and the signal is not modulated by the optical modulator 34 during the time period while the cutting machine 3 is cutting both data area and lead-out area.

The master disk 26 is rotated by a spindle motor 38. The spindle motor is controlled by the spindle servo circuit 39. Actually, the FG signal whose signal level rises is output at each predetermined rotation angle. The FG signal is output by an FG signal generator (not illustrated) provided on the bottom of the spindle motor 38. The spindle servo circuit 39 drives the spindle motor 38 so that the frequency of the FG signal is adjusted to a predetermined frequency. As described above, the master disk 26 is rotated at a predetermined rotation speed.

A recording laser source 33 emits a laser beam L1 to the optical modulator 34 and the optical modulator 35. The recording laser source 33 comprises, for example, a gs laser. The optical modulator 34 and the optical modulator 35 comprise an electro-acoustic-optical element or the like. The optical modulator 34 changes the traveling direction of the laser beam emitted from the recording laser source 33 according to the key information modulation signal KYD supplied from the modulation circuit 32. In other words, the optical modulator 34 irradiates the laser beam L2 whose emission angle is changed slightly according to the level of the key information modulation signal KYD. Such modulation of the emission angle of the laser beam is used as an AOD (Acoustic Optical Deflector) generally.

The laser beam L2 traveling in the direction which is changed by the key information modulation signal KYD is applied into the optical modulator 35 and ON/OFF-controlled by the optical modulator 35 correspondingly to the EFM (Eight to Fourteen Modulation) signal SD supplied from the modulation circuit 31, and emitted as a laser beam L3.

The mirror 36 reflects the laser beam L3 in the direction of the optical path which is reflected at an angle of, for example, 90 degrees toward the master disk 26. An objective lens 37 converges the reflected beam from the mirror 36 on the recording side of the master disk 26. The traveling direction change (corresponding to the key information modulation signal KYD) of the laser beam L3 reflected on the mirror 36 is recorded on the disk in the form of positional deviation of the converged beam spot.

The mirror 36 and the objective lens 37 are moved step by step by a thread mechanism (not illustrated) in the radial direction synchronously with the rotation of the master disk 26. As described above, the convergent position of the laser beam L3 is moved step by step, for example, from the inner region toward the outer region of the master disk 2, thereby forming a spiral track on the master disk 26. The pits are formed successively on the track corresponding to the EFM signal SD. Because the traveling direction of the laser beams L2 and L3 is modulated by the optical modulator 34 as described above, the central position of the pit string formed on the lead-in area is deviated in the transverse direction with respect to the track correspondingly to the key information modulation signal KYD.

The master disk 26 is exposed to the laser beam L3 modulated according to the double-encrypted digital audio signal SC and the second key information signal KY2.

The exposed master disk 26 is subjected to developing and plating process as described in FIG. 1, thereby forming a stamper 28. The stamper 28 is set on the injection molding machine 29 to form a disk substrate 4 formed of such a plastic material as polycarbonate. The reflection film is formed on the disk substrate 4, thereby forming a half-finished disk 5. Finally, the half-finished disk 5 is loaded in a CD-R recording unit 7. In the CD-R recording unit 7, the area where the user data is not recorded (lead-out area) is accessed in response to a command from the computer 6, and the first key information signal KY1 from the first key information generation circuit 24 is additionally recorded. The information which is additionally recorded in the CD-R recording unit is recorded in the form of reflectance change of the reflection film formed by the reflection film forming machine 41.

Basically, the CD-R recording unit 7 has the same structure as that of the commercially available CD-R unit excepting that the CD-R unit is modified so that the lead-out area is accessed.

Figure 3A:
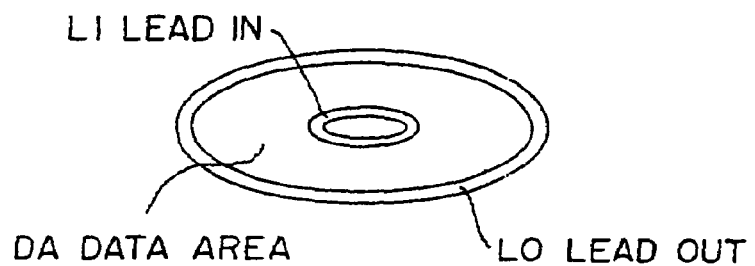
FIGS. 3A to 3D are diagrams for an example of an optical disk in accordance with an embodiment of the present invention; A is a perspective view of the optical disk, B is a diagram for the lead-in area, C is a diagram for the data area, and D is a diagram for the lead-out area.

A compact disk 8 completed as described above (finished disk) is shown schematically in FIG. 3A. As shown in FIG. 3A, the compact disk 8 is divided into 3 areas. The innermost circumference side is the lead-in area (lead-in) LI, the intermediate area is the data area DA, and the outermost area is the lead-out area (lead-out) LO.

Figure 3B:
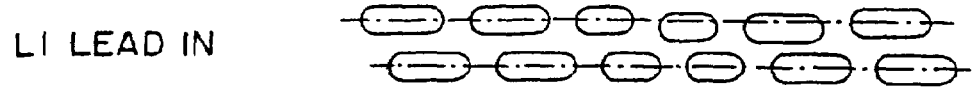

On the lead-in area LI, the TOC information and the second key information signal KY2 used for accessing the compact disk 8 are recorded. An example of a schematic picture obtained when the lead-in area is observed by a microscope is shown in FIG. 3B whose TOC information is recorded in the form of pits. The central position of each of such pits is deviated slightly from the center of the track, the second key information signal KY2 is recorded in the form of deviation.

Figure 3C:
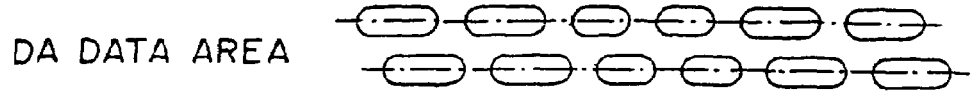

The data area DA is an area where the double-encrypted digital audio signal SC is recorded. When this area is observed by a microscope, it is found that the double-encrypted digital audio signal SC is recorded in the form of pits, for example, as shown in FIG. 3C. Because the second key information signal KY2 is not recorded on the data area, the central position of each pit is not deviated.

Figure 3D:
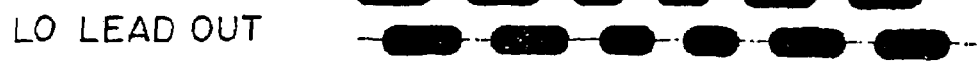

On the lead-out area LO, the key information KY1 is recorded by the CD-R recording unit 7. When this area is observed by a microscope, it is found that the first key information signal KY1 is recorded in the form of reflectance change as shown, for example, in FIG. 3D. It is understood that the information is recorded not as a physical change (concave-convex).

For example, it is assumed that a pirated disk maker get a compact disk 8 manufactured as described above and tries to make a pirated disk by supplying the reproduced signal obtained from the compact disk 8 to a cutting machine. As a result, the TOC information recorded on the lead-in LI, the information of the data area, and the information of the lead-out are all supplied to the cutting machine, and recorded on the pirated disk. However, the second key information signal KY2 recorded in the form of positional deviation of each pit on the lead-in LI does not appear in the reproduced signal, thus not recorded in the pirated disk. Because the second key information signal KY2 cannot be decrypted by the use of the pirated disk made in the manner as described above, it is impossible to reproduce the music signal or the like. Accordingly, the pirated disk is useless, and making of such pirated disks by the use of the method as described above is prevented.

Next, it is assumed that a pirated disk maker gets a compact disk 8 and tries to make a pirated disk by the use of a method in which the pits are transferred physically. In this case, it is likely that the second key information signal KY2 recorded in the form of positional deviation on the lead-in area is transferred onto the pirated disk as is. However, the first key information signal KY1 recorded on the lead-out LO area is recorded in the form of reflectance change, and does not cause physical convex-concave. Therefore, the first key information signal KY1 is not transferred onto the pirated disk. Because the encryption by the first key information signal KY1 cannot be decrypted by the use of the pirated disk made as described above, therefore, it is impossible to reproduce it. And accordingly, the pirated disk is useless, so that making of such pirated disks by the use of the method as described above is prevented.

As described above, according to the example in accordance with the embodiment of the present invention, it is possible to prevent the pirated disk making by the use of any of the methods in which a disk is physically transferred and the method in which the reproduced signal is supplied directly to a cutting machine. Next, a reproducing apparatus 50 for reproducing a compact disk 8 manufactured as described above will be described with reference to FIG. 4.

Figure 4:
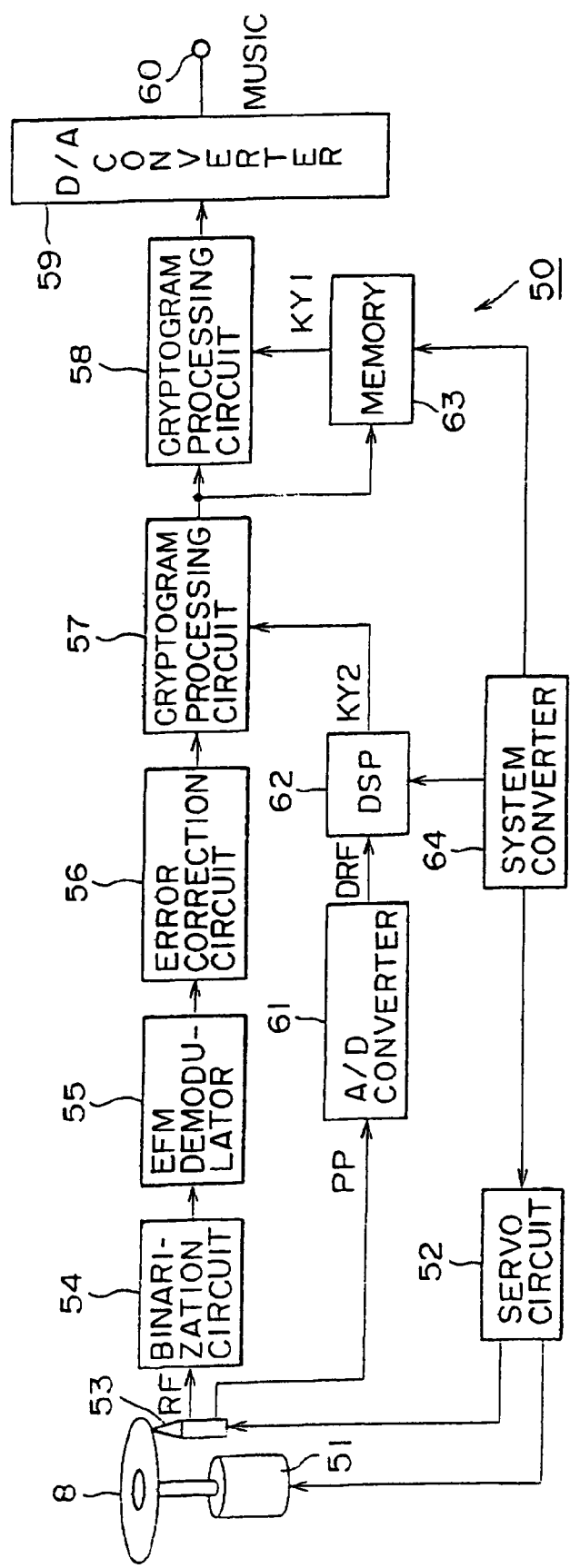
FIG. 4 is a block diagram for an example of a reproducing apparatus for reproducing an optical disk in accordance with the embodiment of the present invention.

The reproducing apparatus 50 shown in FIG. 4 is controlled by a system controller 64. The compact disk 8 is rotated by a spindle motor 51. The spindle motor 51 and an optical pickup 53 are controlled by a servo circuit 52 so as to perform a predetermined operation. A reproduced RF signal generated from the optical pickup 53 is supplied to a binary circuit 54. A push-pull signal PP supplied from the optical pickup 53 is supplied to an A/D converter 61.

The binarization circuit 54 compares the supplied reproduced RF signal with a predetermined slice level, thereby generating a binary signal. The binary signal is supplied to an EFM demodulation circuit 55. The EFM demodulation circuit 55 demodulates EFM from the binary signal, thereby generating an 8 bit-signal, and supplies the generated 8 bit-signal to an ECC (error correction circuit) circuit 56. The ECC circuit 56 corrects errors in the output of the EFM demodulation circuit 55 according to the ECC (Error Correcting Code) added during coding in recording. Such an error is caused, for example, from a defect on the compact disk 8.

On the other hand, the A/D converter 61 digitizes (quantization) the push-pull signal and supplies it to a DSP 62 as a digital reproduced signal DRF. Because the push-pull signal PP is a signal which is proportional to the positional deviation of the pit from the track center, the push-pull signal includes the information recorded as the second key information signal KY2. The DSP 62, which is a digital signal processing processor, processes the digital reproduced signal DRF according to a program recorded in the internal portion and demodulates FM modulation modulated by the modulation circuit 32, thereby finding the second key information signal KY2.

A first cryptogram processing circuit 57 decrypts the encryption applied to the output signal from the ECC circuit 156 by the use of the second key information signal KY2 determined as described above. The information from which the second encryption (encrypted by the second encryption circuit 23 shown in FIG. 1) is decrypted is supplied subsequently to the second encryption processing circuit 58. Simultaneously, the signal from the ECC circuit 56 is supplied also to a memory 63. A system controller 64 controls the memory 63 to store the first key information signal KY1 in the memory 63. Consequently, the first key information signal KY1 stored in the memory 63 is kept supplied to the second cryptogram processing circuit 58, thus the second cryptogram processing circuit 58 can decrypt the first encryption (encrypted by the first encryption circuit 22 shown in FIG. 1).

Because the encryption is decrypted as described above, the digital audio signal SA is restored on the output side of the second cryptogram processing circuit 58. The digital audio signal SA obtained as described above is converted to an analog audio signal by a D/A converter 59 and sent to an output terminal 60, and supplied to a speaker or the like for sounding.

The decryption operation as described above is performed by the system controller 64. The system controller 64 is composed so that a predetermined operation shown by a flow chart in FIG. 5 is performed by the reproducing apparatus 50 each time a new optical disk 8 is loaded, thereby realizing the decryption process as described above consistently.

Figure 5:
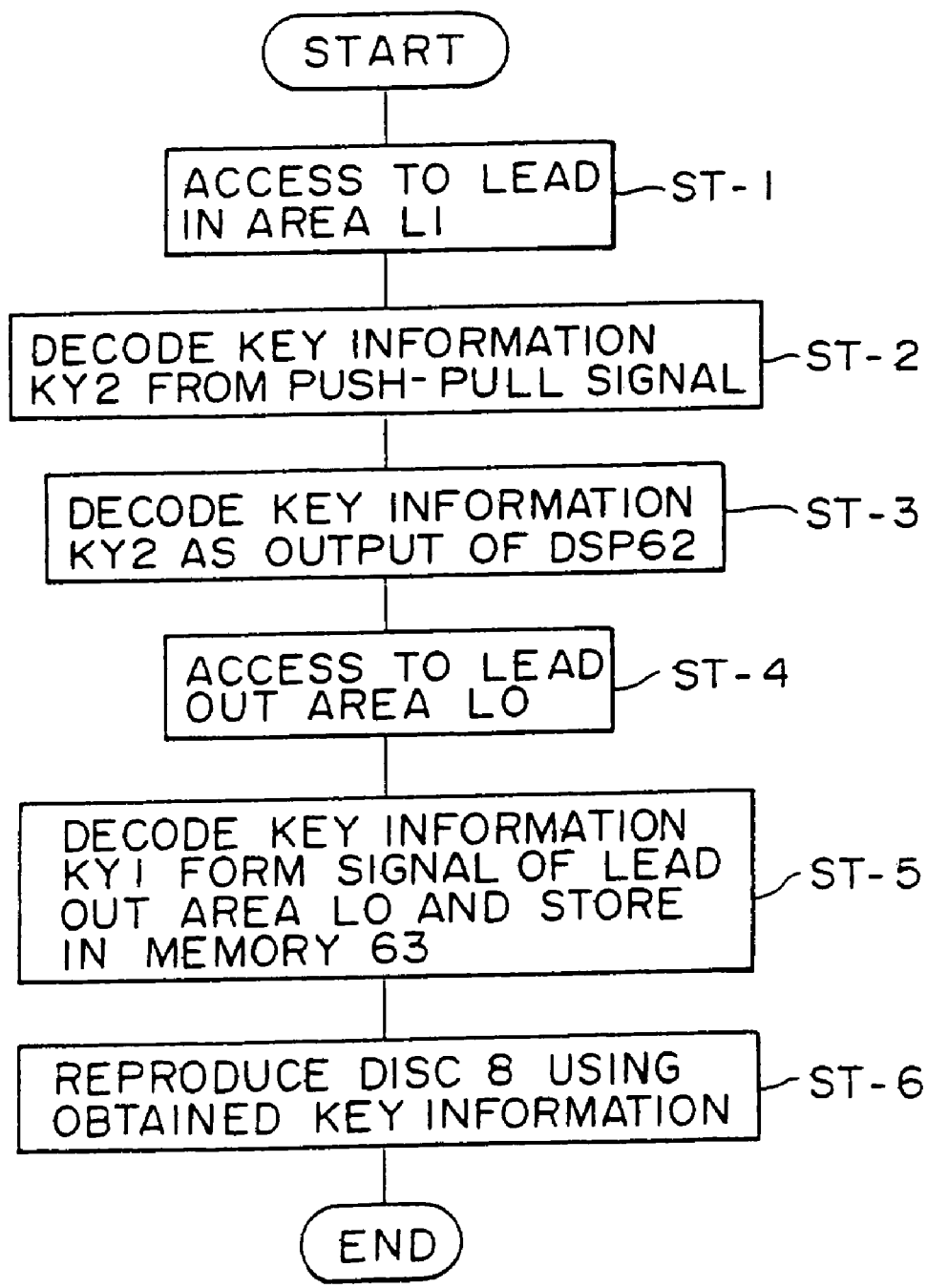
FIG. 5 is a flow chart for the operation of a system controller provided for the reproducing apparatus for reproducing the optical disk shown in FIG. 4.

In the process performed by the system controller 64 shown in FIG. 5, first the system controller 64 gives a command to respective components of the system including the servo circuit 52 in step ST-1 and instructs for the movement of the focal point of the beam emitted from the optical pickup to the lead-in area LI of the optical disk 8. Next, in step ST-2, the push-pull signal PP supplied from the optical pickup 53 is quantized by the A/D converter 61, and processed by the DSP 62, thereby decoding the information recorded as the second key information signal KY2. Next, in step ST-3, the decoded second key information signal KY2 is supplied to the output terminal of the DSP 62, and the value is retained.

The system controller 64 instructs for the movement of the focal point of the beam emitted from the optical pickup to the lead-out area LO in step ST-4. Next, in step ST-5, the system controller 64 instructs for storing of the read-out first key information signal KY1 in the memory 63. As described above, the first key information signal KY1 and the second key information signal KY2 are obtained, and then the system controller 64 controls the whole system so as to reproduce the data from the compact disk 8 for sounding.

As described above, the system controller 64 controls the whole system so that the key information recorded on the lead-in area LI and lead-out area LO is read out and the decryption of cryptogram is performed and the sound is generated after that. Consequently, it is prevented that the encryption is not decrypted while a large noise is generated as a sound from the speaker.

In the case that the compact disk 8 is a normal disk (not a pirated disk), both first and second key information signals KY1 and KY2 are decoded correctly. Consequently, the first and second cryptogram processing circuits 57 and 58 can obtain the information required for decryption. Therefore, the output of the second cryptogram processing circuit 58 is supplied to the D/A converter 59, the output of the D/A converter 59 is converted to, for example, a music signal, and thus the subject user can enjoy the music recorded in the compact disk 8.

In the case that a disk obtained by the apparatus for manufacturing optical disks of the present invention is reproduced and the reproduced signal is supplied again to a cutting machine to make a pirated disk, the pirated disk has no second key information signal KY2 recorded in the form of positional deviation of the pit. Therefore, when the pirated disk is tried to be reproduced by the use of an optical disk reproducing apparatus shown in FIG. 4, the user can not enjoy the music from such a pirated disk. In the case that a pirated disk is obtained by a method in which the physical configuration of a disk is transferred as described previously, also the user can not enjoy the music.

In the above-mentioned example of this embodiment, although the case that the second key information KY2 is recorded in the form of positional deviation of the pit is described, the present invention is not limited only to this case; for example, the second key information signal KY2 may be recorded in the form of slight change of the pit width. In this case, an optical detection system for detecting a push-pull signal is not required for the optical disk reproducing apparatus, the structure of the optical disk reproducing apparatus is simplified and the cost is reduced.

1-2) Effects of the Above Embodiments

According to the first to fifth present inventions, because an optical disk manufacturing apparatus for manufacturing an optical disk having recorded digital data to be read out by irradiation of a laser beam comprises an encryption unit for encrypting input digital data according to a plurality of key information, an optical disk substrate manufacturing unit for manufacturing an optical disk substrate on which the encrypted digital data and the key information are recorded in the form of physical configurational change, a reflection film forming unit for forming a reflection film on the optical disk substrate, and a key information recording unit for recording the key information on the optical disk substrate having the reflection film thereon, an optical disk manufacturing apparatus which exhibits the effect as described herein under is obtained. In detail, according to the first to fifth present inventions, because the key information is recorded by the use of two different methods, namely physical configurational change and reflectance change of a reflection film, an optical disk manufactured by such a manufacturing apparatus of the present invention can not be duplicated not only by the use of physical transfer and a pirated disk can not be obtained but also by a method in which the reproduced signal reproduced from an optical disk manufactured by the use of the manufacturing apparatus of the present invention is supplied directly to a cutting machine. Therefore, accordingly to the optical disk manufacturing apparatus of the first to fifth present inventions, an optical disk which protects the profit of the object rightful copyright holder is manufactured.

According to the sixth to eighth present inventions, because an optical disk manufacturing method for manufacturing an optical disk having the recorded digital data to be read out by irradiating a laser beam comprises an encryption step for encrypting input digital data according to a plurality of key information, an optical disk substrate manufacturing step for manufacturing an optical disk substrate on which the encrypted digital data and the key information are recorded in the form of physical configurational change, a reflection film forming step for forming a reflection film on the optical disk substrate, and a key information recording step for recording the key information on the optical disk substrate on which the reflection film is formed, an optical disk manufacturing method which exhibits the effect as described hereunder is obtained. In detail, according to the sixth to eighth present inventions, an optical disk manufactured by an optical disk manufacturing method of the present invention can not be duplicated not only by means of physical transfer and a pirated disk can not be obtained but also by a method in which the reproduced signal reproduced from an optical disk manufactured by the use of the optical disk manufacturing method of the present invention is supplied directly to a cutting machine. Therefore, accordingly to the optical disk manufacturing method of the sixth to eighth present inventions, an optical disk which protects the profit of the rightful copyright holder is manufactured.

According to the ninth present invention, because an optical disk has digital data recorded in the form of physical configurational change and reproduces the digital data by reflecting an incident laser beam from its reflection film, wherein the digital signal is encrypted according to a plurality of key information, one of the plurality of key information is recorded on the optical disk in the form of physical configurational change, and at least one of the plurality of key information is recorded in the form of reflectance change of the reflection film on the optical disk, it is possible to obtain an optical disk which exhibits the effect as described hereunder. In detail, according to the ninth present invention, because the digital data recorded on an optical disk is encrypted according to a plurality of key information, one of the plurality of key information is recorded in the form of physical configurational change on the optical disk and at least one of the plurality of key information is recorded in the form of reflectance change of a reflection film on the optical disk, the optical disk of the ninth present invention can not be duplicated not only by means of physical transfer and a pirated disk can not be obtained but also by a method in which the reproduced signal reproduced from an optical disk of the present invention is supplied directly to a cutting machine. Therefore, accordingly to the optical disk manufacturing method of the ninth present invention, it is possible to manufacture an optical disk which protects the profit of a rightful copyright holder.

According to the tenth present invention, because the invention provides an optical disk reproducing method for reproducing data from an optical disk having digital data recorded thereon in the form of physical configurational change and so as to be read out with a laser beam irradiated on its reflection film, wherein the digital data is encrypted according to a plurality of key information, one of the plurality of key information is recorded in the form of physical configurational change on the optical disk, and at least one of the plurality of key information is recorded in the form of reflectance change of the reflection film on the optical disk, the optical disk reproducing method which exhibits the effect as described herein under is obtained. In detail, according to the tenth present invention, it is possible to obtain the optical disk reproducing method for decrypting correctly and reproducing the data recorded on a disk, even though the disk is subjected to pirated copy protection by means of encryption.

(2-1) Configuration in Another Embodiment

Figure 6:
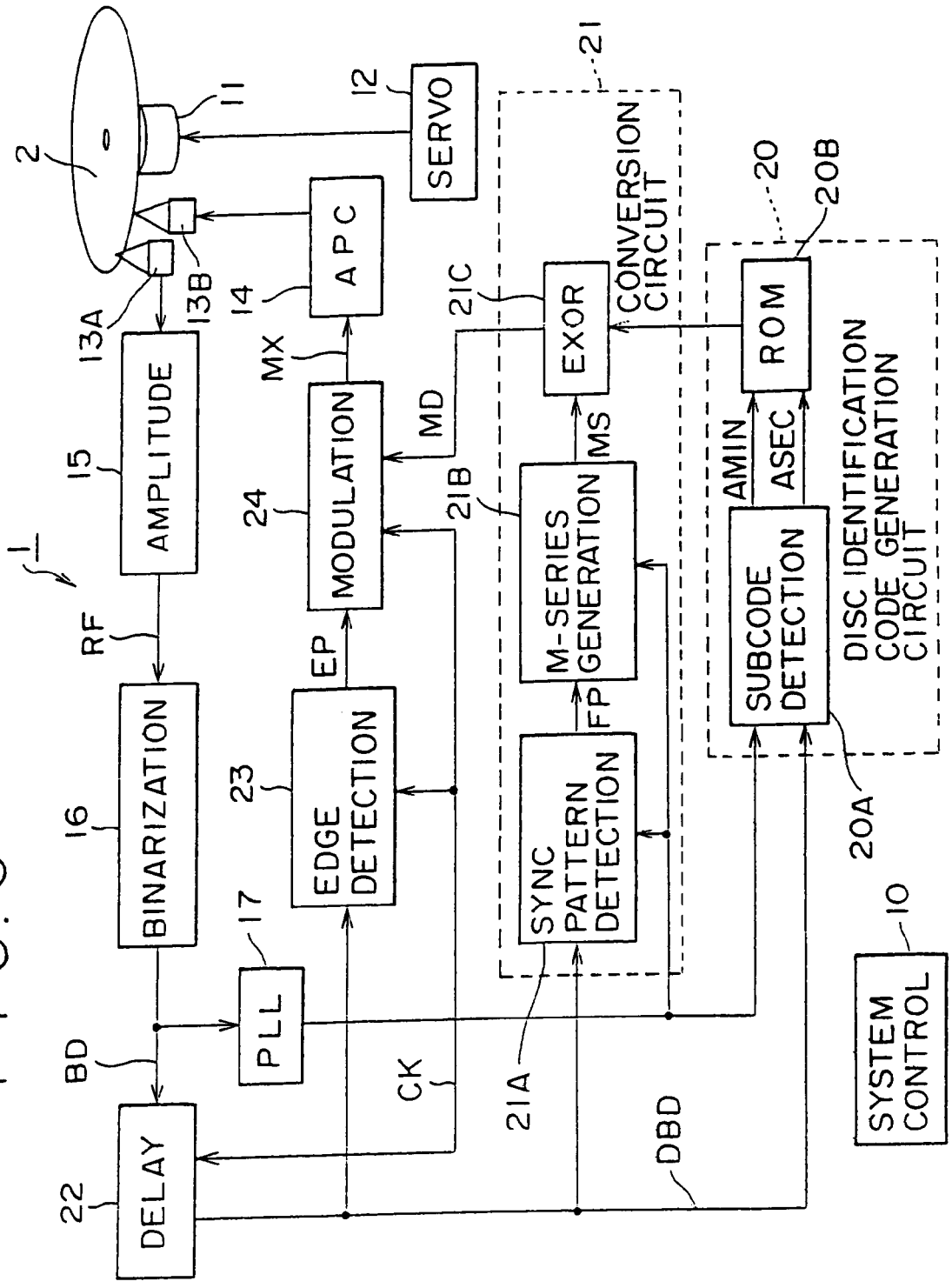
FIG. 6 is a block diagram for an optical disk apparatus used for processing a compact disk in accordance with an embodiment of the present invention.

FIG. 6 is a block diagram for an optical disk apparatus in accordance with an embodiment of the present invention. The optical disk apparatus 1 records a disk discrimination code ED on a compact disk 2 on which digital audio signal is already recorded in the form of pit string in a compact disk manufacturing process.

In detail, as shown in FIG. 7, a disk substrate 3 of the compact disk 2 (shown in FIG. 7D) is manufactured with such plastic as polycarbonate in the same manner as used for manufacturing an ordinary compact disk by means of injection molding using a stamper. Fine convex-concave configuration corresponding to pits and lands is formed on the information recording side of the disk substrate 3 in the injection molding process. As shown in an expanded view (FIG. 7E) with an arrow a, a reflection recording film 4 for reflecting a laser beam is formed on the information recording side of the disk substrate 3 of the compact disk 2 by means of, for example, vapor deposition, and then a protective film 5 for protecting the reflection recording film 4 from corrosion is formed.

Such a subcode information absolute time for specifying an audio signal reproduction position is recorded in the form of repeated pits and lands on the compact disk 2 in the same manner as used for an ordinary compact disk, and a laser beam L is irradiated onto the reflection recording film 4 through the disk substrate 3 and the reflected beam is received, thereby reproducing the audio signal or the like recorded on the compact disk 2.

Figure 7A:
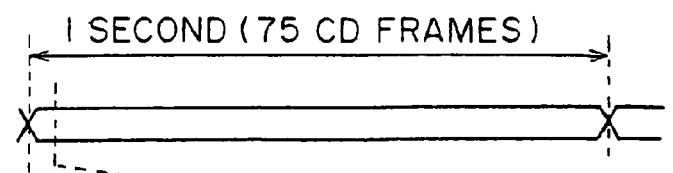
FIGS. 7A to 7E are a cross sectional view and a timing chart for a compact disk which is processed by the optical disk apparatus shown in FIG. 6.
Figure 7B:
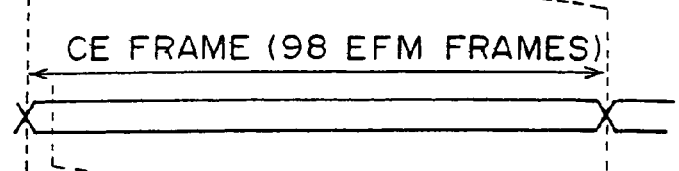
Figure 7C:
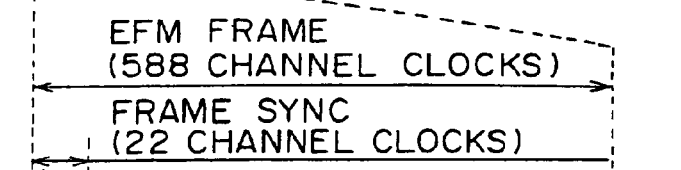
Figure 7D:
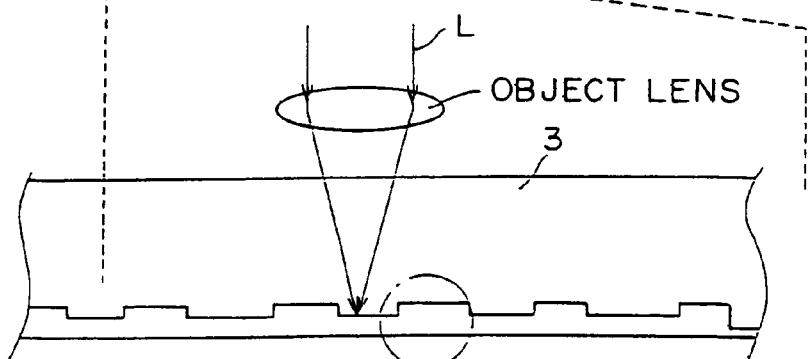
Figure 7E:
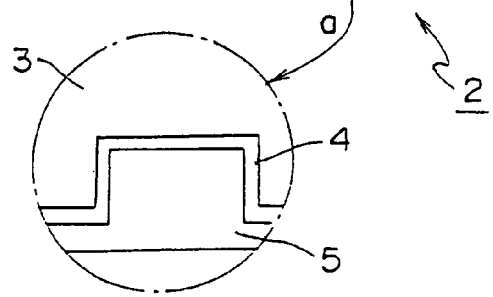

75 CD frames are assigned for each second of repeated pits and lands formed as described above (FIG. 7A) in the same manner as used for an ordinal compact disk and respective 98 EFM frames are assigned to each CD frame (FIG. 7B). Furthermore, each EFM frame is divided into 588 channel clocks, and a frame sync is assigned to the first 22 channel clocks. The basic period of the pit and land configuration is 1 period of 1 channel clock. The pit and land configuration is repeated as a length of the integral multiple of this basic period, and the frame sync is composed of a period of 11 T.

In this embodiment, the reflection recording film 4 is formed so as to have the same film structure as that of the information recording side of a CD-R. Thereby, when a laser beam L having an intensity higher than a certain level is irradiated on the compact disk 2, the reflectance of the reflection recording film 4 is changed irreversibly at a position where the laser beam is irradiated, and the reflectance change is detected in the form of intensity change of the reflected beam.

In the optical disk apparatus 1 (FIG. 6), a system control circuit 10 comprising a micro-computer controls the whole operation, and records a disk discrimination code ED on the compact disk 2.

In the optical disk apparatus 1, a spindle motor 11 rotates the compact disk 2 at a constant linear speed under the control of a servo circuit 12.

An optical pickup 13A detects the reproduction signal RF from the compact disk 2 prior to an optical pickup 13B, and the optical pickup 13B records the disk discrimination code ED on the compact disk 2 according to the process result of the reproduction signal RF detected by the optical pickup 13A.

In detail, the optical pickups 13A and 13B are linked by a thread mechanism in the movement in the radial direction of the compact disk 2 so as to irradiate laser beams adjacently on the same track. The optical pickups 13A and 13B are under tracking control and focus control independently according to the reception result of the reflected beam obtained by irradiating the laser beam on the compact disk 2, thereby the optical pickup 13B scans the same position just after the optical pickup 13A scans.

The optical pickup 13A receives the reflected beam at a predetermined reception element, and detects the reproduction signal RF having the signal level which varies correspondingly to the beam intensity change of the reflected beam on the reception face of the reception element. The optical pickup 13B raises the beam intensity of the laser beam at a predetermined timing under the control of the APC (Automatic Power Control) circuit 14, thereby locally changing the reflectance of the reflection recording film 4 of the compact disk 2.

An amplifier circuit 15 amplifies the reproduction signal RF supplied from the optical pickup 13A with a predetermined gain and sends it out. A binarization circuit 16 binarizes the reproduction signal RF supplied from the amplifier circuit 15 according to a predetermined reference level and outputs a binary signal BD. A PLL circuit 17 reproduces a channel clock CK from the binary signal BD.

A delay circuit 22 delays the timing of the binary signal BD for a time period from the time when the optical pickup 13A scans a position to the time when the optical pickup 13B scans the same position, and outputs the delayed timing.

A disk discrimination code generation circuit 20 comprises a subcode detection circuit 20A and a read-only memory (ROM) 20B. The subcode detection circuit 20A processes the binary signal DBD which is delayed a predetermined time period by the delay circuit 22, thereby reproducing subcode information included in the binary signal DBD. Furthermore, the disk discrimination code generation circuit 20 selectively generates the time information of minute (AMIN) and second (ASEC) indicated by an absolute time respectively from the minute, second, and frame included in the subcode. At that time, the subcode detection circuit 20A also generates the reset pulse which is synchronous with the second (ASEC) time information and sends it out to a conversion circuit 21.

Herein, the minute (AMIN) and second (ASEC) time information, which indicate a data position on the compact disk 2, are the subcode information specified as the standard of the compact disk 2. In other words, the minute (AMIN) time information represents the data recorded on the compact disk 2 in minutes and takes a value, for example, from 0 to 74. The second (ASEC) time information specifies a minute-unit position specified in minutes (AMIN) more finely in seconds, and takes a value, for example, from 0 to 59.

The read-only memory 20B holds the disk discrimination code ED, and generates the data which is held according to the minute (AMIN) and second (ASEC) time information supplied from the subcode detection circuit 20A. Herein, the disk discrimination code ED includes the ID information which is set inherently in each disk, the information of the manufacturing factory, the data of manufacture, and the information for controlling permission of copying, and further includes a sync signal for indicating the start of the disk discrimination code ED and an error correction code. The read-only memory 20B holds the disk discrimination code ED as bit data, and outputs 1 bit disk discrimination code ED to the "1" address decided by the minute (AMIN) and second (ASEC) time information. Thereby, the read-only memory 20B generates 1 bit disk discrimination code ED for each second.

To generate the disk discrimination code ED and output it as described above, in the compact disc 2, 1 second consists of 75 CD frames and 1 CD frame consists of 98 EFM frames (FIG. 8(A-1) to (A-3)) as shown in comparison between FIG. 7 and FIG. 8, the disk discrimination code generation circuit 20 generates 1 bit disk discrimination code ED (FIG. 8D) in units of 7350 (7350=75.times.98) EFM frames, and sends it out. Thereby, the disk discrimination code generation circuit 20 generates and sends out the disk discrimination code ED so that at least 10 pit edges on the compact disk correspond to 1 bit of the disk discrimination code ED.

The conversion circuit 21 scrambles the disk discrimination code ED with reference to the sync pattern and sends it out. It is thereby difficult to find the disk discrimination code ED.

In other words, in the conversion circuit 21, a sync pattern detection circuit 21A detects the sync pattern which appears repeatedly in the binary signal DBD supplied from the delay circuit 22. At that time, the signal level of the binary signal DBD (FIG. 8A-4) is switched correspondingly to a pit string formed on the compact disk 2, the signal level rises up at the frame sync assigned to the start of each frame for a time period of 11 T and then the signal level falls down for a time period of 11 T.

Therefore, the sync pattern detection circuit 21A determines the signal level of the consecutive binary signal DBD with reference to the channel clock CK (FIG. 8B) by the use of multi-connected flip-flop circuits, thereby detecting the frame sync. In the present embodiment, the sync pattern detection circuit 21A generates a frame pulse FP (FIG. 8C) whose signal level rises during a time period T, which is 1 channel clock before the start of the frame sync in the comparison with the timing of the binary signal DBD to be processed by the subcode detection circuit 20A according to the detection result of the frame sync.

An M-series generation circuit 21B comprises a plurality of cascade-connected flip-flops and exclusive OR circuits, sets the initial value to each of the plurality of flip-flops at a timing corresponding to the second (ASEC) time information change according to the reset pulse supplied from the subcode detection circuit 20A, and then transfers the set content successively synchronously with the frame pulse FP and feeds it back at a predetermined interstage, thereby generating M-series random number data MS in which the logic levels 1 and 0 appear at the same probability.

The exclusive OR circuit 21C receives the M-series signal MS and the disk discrimination code ED, and generates the exclusive OR signal to be used as a conversion signal MD (FIG. 8E). In detail, the exclusive OR circuit 21C generates a conversion signal MD according to the logical level of the M-series signal MS in the case that the logical level of the disk discrimination code ED is 0. On the other hand, the circuit 21C generates a conversion signal MD having the inverted logical level of the M-series signal MS in the case that the logical level of the disk discrimination code ED is 1. Thereby, the exclusive OR circuit 21C modulates the disk discrimination code ED according to the M-series random number.

An edge detection circuit 23 detects the timing of each pit edge formed on the compact disk 2 according to the binary signal DBD supplied from the delay circuit 22 and sends it out. The modulation circuit 24 gates the conversion signal MD at the timing of this edge, thereby raising the control signal MX for an APC circuit 14. The beam intensity of the laser beam is thus raised in a moment, thereby changing the reflectance of the compact disk 2 locally.

Figure 9:
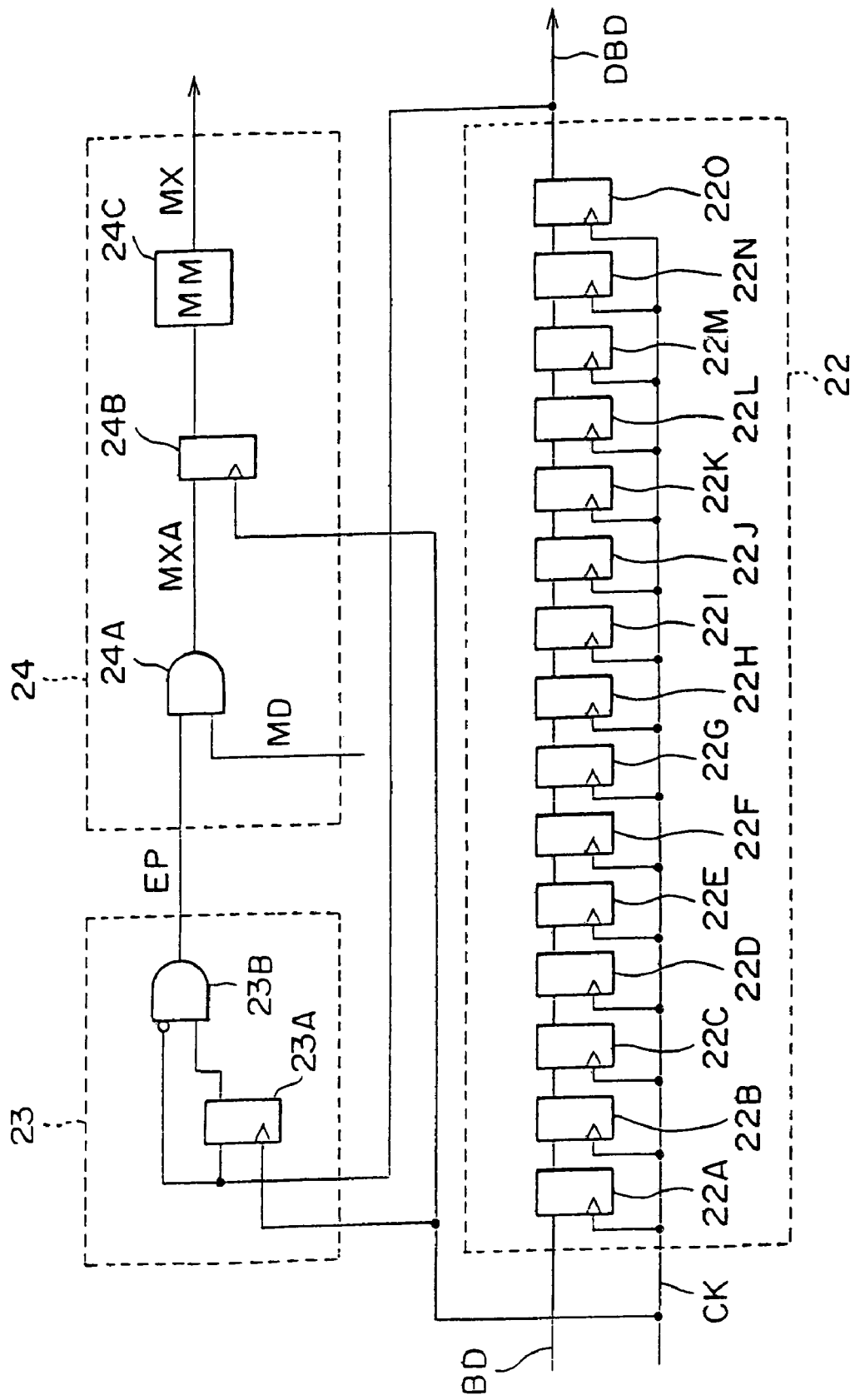
FIG. 9 is a block diagram for a delay circuit, an edge detection circuit, and a modulation circuit of the optical disk apparatus shown in FIG. 6.

In detail, as shown in FIG. 9, the delay circuit 22 transfers the binary signal BD synchronously with the channel clock CK successively by the use of the predetermined stages of cascade-connected flip-flops 22A to 22O, thereby delaying the binary signal BD and outputs the delayed signal. The number of stages of the flip-flops 22A to 22O is set so that the delay time given to the binary signal BD due to the transfer of the binary signal becomes equal to the time period between the time when the optical pickup 13A scans a position and the time when the optical pickup 13B scans the same position.

The edge detection circuit 23 supplies the output signal of the flip-flop 22O the flip-flop 23A which is operated according to the channel clock CK and supplies the input/output signal of the flip-flop 23A to an AND circuit 23B. The AND circuit 23B has the one input terminal which is set as an inverse input terminal so that the logical level of the output terminal is raised when the logical level of two input terminals is different from each other. The edge detection circuit 23 detects the timing when the logical level of the binary signal BD is switched and outputs the output signal of the AND circuit 23B which is the detection result as an edge detection signal EP (FIG. 8F).

The modulation circuit 24 supplies the edge detection signal EP and the conversion signal MD to the AND circuit 24A, thereby gating the conversion signal MD according to the edge detection signal EP, and generates a conversion signal MXA (FIG. 8G) whose logical level rises at the timing of a pit edge correspondingly to the logical level of the conversion signal MD.

A D-flip-flop 24B, which is operated according to the channel clock CK, removes gridge noise from the modulation signal MXA and outputs the noise-removed signal MXA, and a monostable multi-vibrator (MM) 24C shapes the pulse width of the pulse signal output from the D-flip-flop 24B and outputs the modulation pulse MX (FIG. 8H).

The APC circuit 14 (FIG. 6) switches the beam intensity of the laser beam emitted from the optical pickup 13B correspondingly to the modulation pulse MX from the beam intensity for reproduction to the beam intensity for recording. Herein, the beam intensity for recording implies a beam intensity which is sufficient to change the reflectance of the reflection film 4 of the compact disk 2.

Consequently, the optical disk apparatus 1 raises the beam intensity of the laser beam corresponding to the disk discrimination code ED modulated according to the random number data MS at the timing when the laser beam emitted from the optical pickup 13B scans an edge of a pit P, forms the mark M so as to cover astride the corresponding edge to additionally record the disk discrimination code ED (FIGS. 8I-1 and 8I-2). Therefore, in the compact disk 2, in the case that the disk discrimination code ED is not recorded additionally, the reproduction signal RF of the signal waveform in which the signal level crosses approximately the average level at the timing when the edges of these pits are scanned (FIG. 8J-1) is obtained. On the other hand, in the case that the disk discrimination code ED is recorded additionally as described above, the reproduction signal RF of the signal waveform in which the signal level is deviated locally for reflectance change at the timing of scanning of a pit edge because the reflectance is locally changed at the corresponding edge is obtained. And accordingly, the jitter increases for the reflectance change (FIG. 8J-2). The disk discrimination code ED is recorded on the compact disk 2 according to the jitter detected from the reproduction signal RF, and the disk discrimination code ED is reproduced with reference to the signal level change of the reproduction signal RF.

In the optical disk apparatus 1, the beam intensity of the laser beam which is raised by the APC circuit 14 is set and the pulse width of the modulation pulse MX, which controls the time period of the raised beam intensity of the laser beam, is set so that the reproduction signal RF is processed with the same reliability as that of the conventional reproduction for generating the audio signal even though the signal waveform of the reproduction signal RF is changed as described above, in other words, so that the reproduction signal RF is binary-discriminated with sufficient margins in phase and amplitude, thereby generating a channel clock CK correctly.

Figure 10:
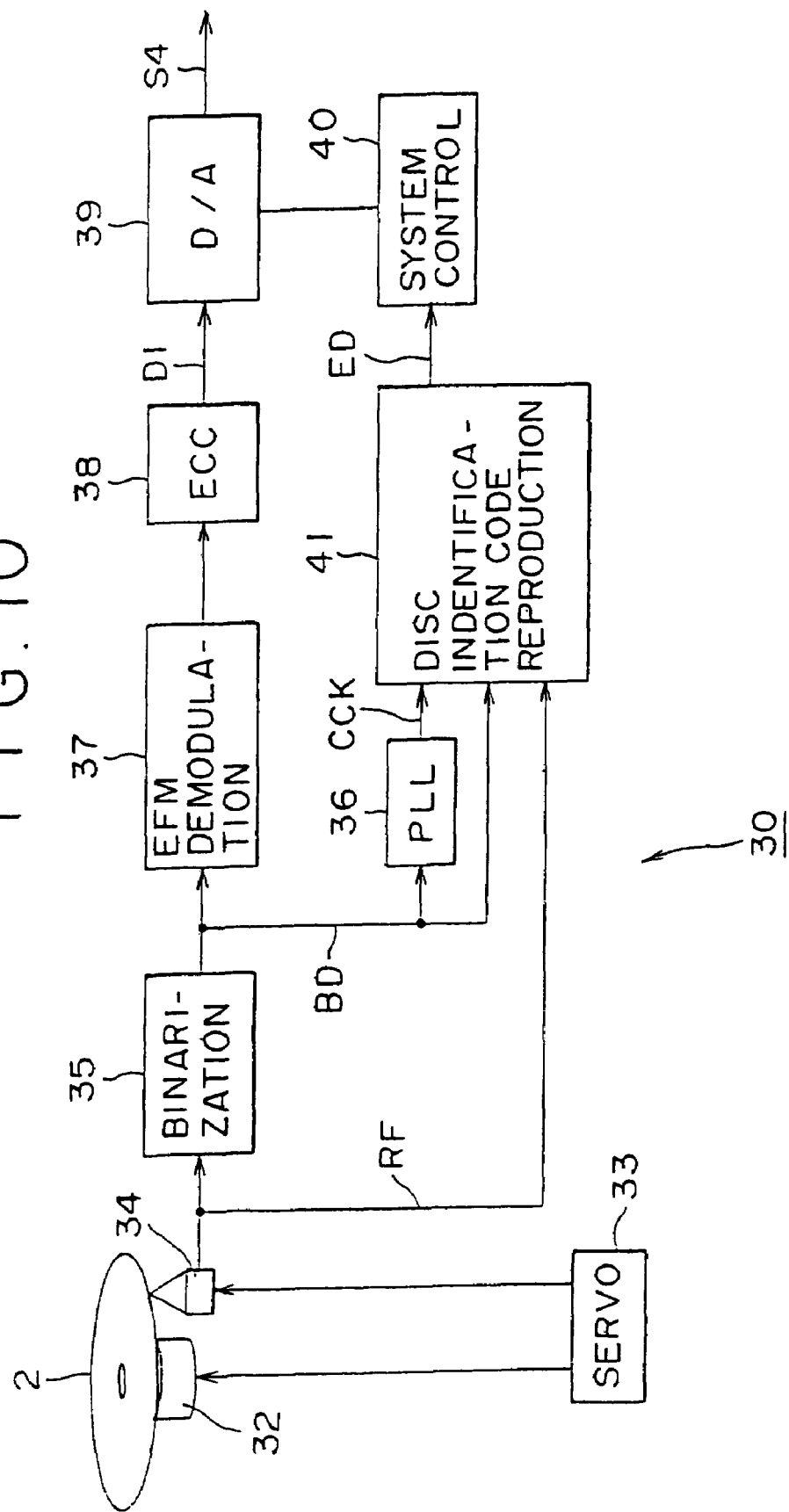
FIG. 10 is a block diagram for a compact disk player for reproducing a compact disk recorded by the use of the optical disk apparatus shown in FIG. 6.

FIG. 10 is a block diagram for a compact disk player for reproducing the compact disk 2. In the compact disk player 30, a spindle motor 32 rotates the compact disk 2 at a constant linear speed under the control of a servo circuit 33.

An optical pickup 34 irradiates a laser beam onto the compact disk 2 and receives the reflected beam at a predetermined reception element, then generates a reproduction signal RF whose signal level is changed correspondingly to the beam intensity of the reflected beam at the reception area of the reception element. The signal level of the reproduction signal RF changes correspondingly to each pit recorded on the compact disk 2. At that time, the reflectance of the compact disk 2 is locally changed correspondingly to each pit edge according to the recorded disk discrimination code ED, and the signal level of the reproduction signal RF is thereby changed slightly correspondingly to the reflectance change due to the disk discrimination code ED.

A binarization circuit 35 binarizes the reproduction signal RF with reference to a predetermined reference level, thereby generating a binary signal BD.

A PLL circuit 36 is operated with reference to the binary signal BD, thereby reproducing a channel clock CCK of the reproduction signal RF.

An EFM demodulation circuit 37 successively latches the binary signal BD with reference to the channel clock CCK, thereby reproducing the data corresponding to the EFM modulation signal S2. Furthermore, the EFM demodulation circuit 37 EFM-demodulates the reproduction data and then divides the demodulated data into 8-bit segments with reference to the frame sync, and deinterleaves each generated 8-bit signal and outputs it to an ECC (Error Correcting Code) circuit 38.

The ECC circuit 38 subjects the output data to an error correction process according to the error correction code added to the output data of the EFM demodulation circuit 37, thereby reproducing and outputting the audio data D1.

A digital analog conversion circuit (D/A) 39 subjects the audio data D1 output from the ECC circuit to digital analog conversion process and output the analog audio signal S4. At that time, the digital analog conversion circuit 39 stops the output of the audio signal S4 when the compact disk 2 is determined to be a compact disk copied illegally under the control of a system control circuit 40.

The system control circuit 40 comprises a computer for controlling the operation of the compact disk player 30. The system control circuit 40 determines whether or not the compact disk 2 is an illegally copied disk according to the disk discrimination code ED supplied from the disk discrimination code reproducing circuit 41, and if the compact disk is determined to be an illegally copied disk, then the system control circuit 40 controls the digital analog conversion circuit 39 so as to stop the output of the audio signal S4.

The disk discrimination code reproducing circuit 41 decodes the disk discrimination code ED from the reproduction signal RF and sends it out.

Figure 11:
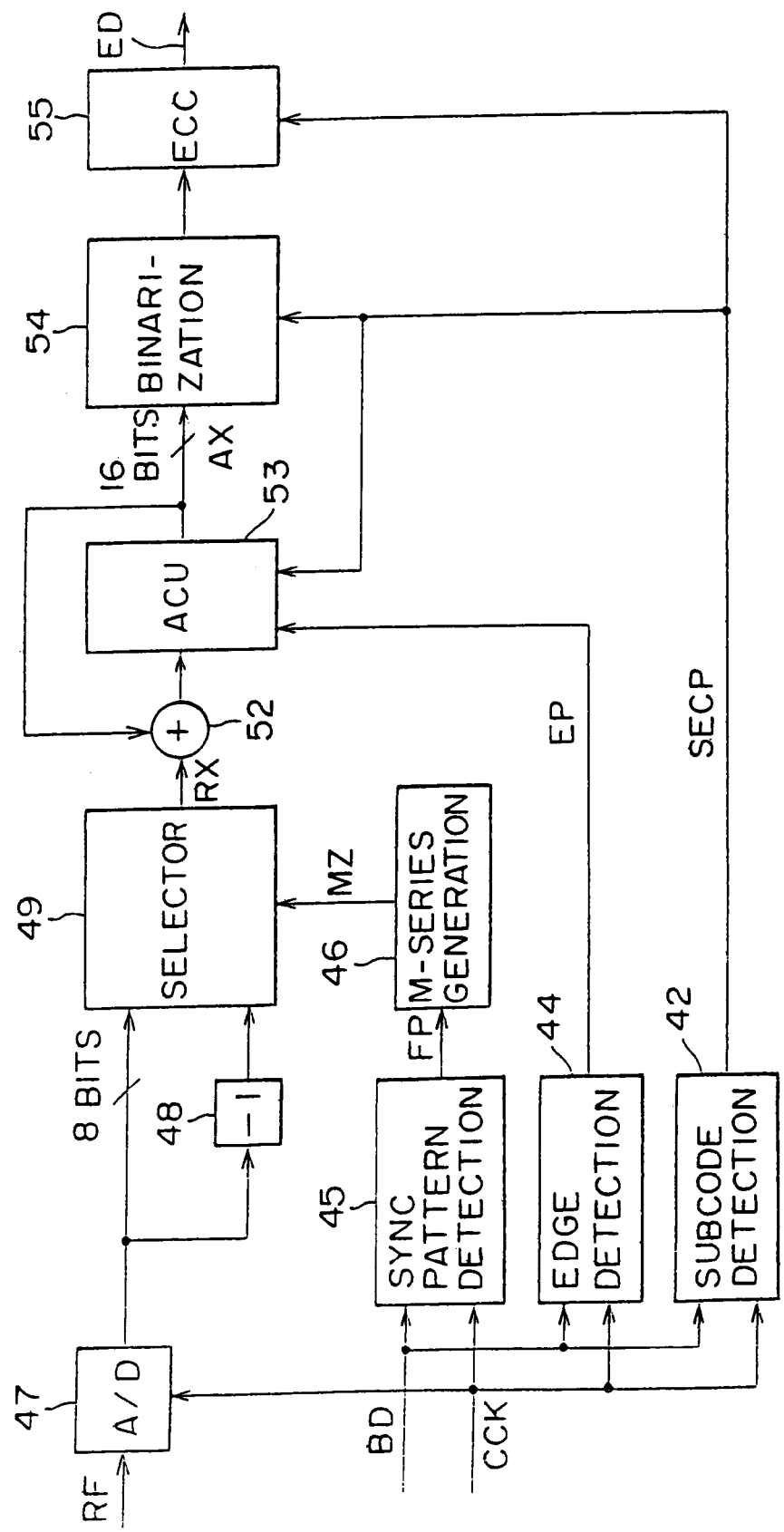
FIG. 11 is a block diagram for a disk discrimination code reproducing circuit of the compact disk player shown in FIG. 10.

FIG. 11 is a detailed block diagram for the disk discrimination code reproducing circuit 41. In the disk discrimination code reproducing circuit 41, a subcode detection circuit 42 monitors the binary signal BD with reference to the channel clock CCK and decodes the subcode information from the binary signal BD. The subcode detection circuit 42 monitors the time information included in the decoded subcode, and generates 1 second detection pulse SECP whose signal level rises each time the time information changes for 1 second.

An edge detection circuit 44 has the same structure as that of the edge detection circuit 23 described above with reference to FIG. 9, and detects a changing point of each pit from the binary signal BD and generates an edge detection signal EP.

A sync pattern detection circuit 45 successively latches the binary signal BD with reference to the channel clock CCK, and discriminates the continuous logical level, thereby detecting the sync pattern and generating a frame pulse FP.

An M-series generation circuit 46 initializes a read-only memory address with reference to the 1 second detection pulse SECP, and then accesses the built-in read-only memory by advancing the addresses one by one according to the frame pulse FP, thereby generating M-series random number data MZ corresponding to the M-series random number data MS generated by the optical disk apparatus 1.

Consequently, in the disk discrimination code reproducing circuit 41, various reference signals required to reproduce the disk discrimination code ED are generated correspondingly to the process in the optical disk apparatus 1.

In the disk discrimination code reproducing circuit 41, the reproduction signal RF is subjected to analog digital conversion process with reference to the channel clock CCK in the analog digital conversion circuit 47, and an 8-bit digital reproduction signal is generated. A polarity inverting circuit (−1) 48 inverts the polarity of the digital reproduction signal and outputs the polarity-inverted signal. A selector 49 selects and outputs the digital reproduction signal supplied directly from the analog digital conversion circuit 47 and the digital reproduction signal whose polarity is inverted, then the signal is supplied from the polarity inverting circuit 48 correspondingly to the logical level of the M-series random number data MZ supplied from the M-series generation circuit 46. In detail, the selector 49 selects and outputs the digital reproduction signal supplied directly if the logical level of the M-series random number data MZ is 1. On the other hand, the selector 40 selects the digital reproduction signal having the inverted polarity if the logical level of the M-series random number data MZ is 0. The selector 49 thus reproduces the logical level of the disk discrimination code ED modulated with the M-series random number data MS according to multi-value data, thereby generating the reproduction data RX of the multi-value data.

An adder 52, which is a 16-bit digital adder, adds up the reproduction data RX and the output data AX from an accumulator (ACU) 53 and outputs the total. The accumulator 53 comprises a 16-bit memory for holding the output data of the adder 52, and composes an accumulation adder together with the adder 52 because the held data is fed back to the adder 52. In detail, the accumulator 53 clears the held data with the 1 second detection pulse SECP, and then records the output data from the adder 52 synchronously with the output signal EP from the edge detection circuit 44. Thus, the adder 52 accumulates the logical value corresponding to a pit edge selected from among the logical values of the reproduction data RX reproduced by the selector 49 every second (7350 frames) of the time information set in the subcode information, thereby generating an accumulated value AX.

A binarization circuit 54 binarizes the output data AX from the accumulator 53 according to a predetermined reference value at the timing when the 1 second detection pulse SECP rises, and outputs the binary data. The reproduction data RX of the disk discrimination code ED reproduced by the selector 49 is thus converted to a binary disk discrimination code ED.

The disk discrimination code ED is subjected to error correction process in an ECC circuit by the use of the error correction code added to the disk discrimination code ED, so that the error corrected code is output.

(2-2) The Operation of Another Embodiment

By applying the configuration described above, in the manufacturing process of a compact disk 2 in accordance with the present embodiment, a mother disk is formed by an ordinary mastering apparatus, and a disk substrate 3 is manufactured by the use of a stamper manufactured from the mother disk. Furthermore, a reflection recording film 4 and a protective film 5 are formed additionally on the disk substrate 3, thereby manufacturing a compact disk 2 (FIG. 7). Pits and lands having a length of an integral multiple of the basic length corresponding to the predetermined basic period T respectively are repeated, and the digital audio signal or the like is recorded on the compact disk 2.

Herein, the compact disk 2 has a reflection recording film 4 having the same film structure as an information recording film of a CD-R, when a laser beam L having the beam intensity higher than a predetermined value is irradiated onto the compact disk 2, the reflectance of the reflection recording film 4 is changed irreversibly at a position where the laser beam is irradiated, and the subdata is recorded in addition to the main data which is recorded in the form of repeated pits and lands.

In the optical disk apparatus 1 (FIG. 6), the disk discrimination code ED is recorded on the compact disk manufactured as described above so that the disk discrimination code ED does not affect adversely the reproduction of the digital audio signal recorded in the form of repeated pits and lands.

In detail, in the optical disk apparatus 1, the reproduction signal RF obtained from the optical pickup 13A is converted to the binary signal BD by the binarization circuit 16, the channel clock CK is reproduced from the binary signal BD by the PLL circuit 17, and the binary signal BD is delayed by the delay circuit 22 according to a time difference between the time when the optical pickup 13A scans a position and the time when the optical pickup 13B used for recording the disk discrimination code ED scans the same position.

In the optical disk apparatus 1, the subcode is detected by the subcode detection circuit 20A from the binary signal DBD supplied from the delay circuit 22, and the disk discrimination code ED is generated at an extremely low bit rate (as low as 1 bit per 1 second) synchronously with the subcode by the access to the read-only memory 20B according to the minute (AMIN) and second (ASEC) information included in the subcode.

Simultaneously, in the sync pattern detection circuit 21A, the sync pattern is detected from the binary signal DBD, and the M-series random number data MS in which logical levels 1 and 0 appear at the same probability at the timing synchronous with the sync pattern is generated according to the detection pattern of the sync pattern in the M-series generation circuit 21B.

Also in the optical disk apparatus 1, the exclusive OR circuit 21C modulates the disk discrimination code ED according to the M-series random number data MS, thereby rendering the disk discrimination code ED difficult to be found. Also in the optical disk apparatus 1, the edge detection circuit 23 (FIG. 9) detects the timing when the optical pickup 13B crosses the edge of a pit, and the subsequent modulation circuit 24 gates the output signal from the exclusive OR circuit 21C with reference to the timing detection result and shapes the output signal into a pulse obtained as the gating result and having a narrow width, and the conversion signal MD obtained thereby raises the beam intensity of the laser beam emitted from the optical pickup 13B intermittently.

Consequently, the reflectance of the reflection recording film 4 of the compact disk 2 is changed locally at a position (FIG. 8) corresponding to the rise of the beam intensity of the laser beam according to the control signal MX. At that time, the output signal from the exclusive OR circuit 21C is gated at the timing when the optical pickup 13B scans the edge of a pit, thereby raising the beam intensity of the laser beam, and the mark M is thereby formed corresponding to the output signal of the exclusive OR circuit 21 so as to cover astride the edge of each pit.

In the compact disk 2 on which the mark M is formed as described above, although the jitter of the reproduction signal RF increases, because the reflectance change introduced as described above is very slight, the reflectance change does not affect the reproduction of the information recorded in the form of pit string adversely, and the clock is generated stably and accurately and the recorded data is reproduced correctly.

In the case of the compact disk 2, because the disk discrimination code ED is disturbed by the use of the M-series in which logical levels 1 and 0 appear at the same probability in the exclusive OR circuit 21C, and the disturbed disk discrimination cod ED is recorded, when the signal waveform of the reproduction signal RF is observed on an oscilloscope, the information of the disk discrimination code ED appears as a noise and the disk discrimination code ED is rendered difficult to be found. Furthermore, the disk discrimination code ED is difficult to be copied. In addition to the above, because 1 bit of the disk discrimination code ED is assigned to 1 second time period, that is, because 1 bit is recorded dispersedly on the total 7350 (7350=75.times.98) EFM frames, the disk discrimination code ED is reproduced consistently even if the reproduction signal is disturbed due to a noise. Although the digital audio signal D1 recorded in the form of pit string on the compact disk 2, on which the disk discrimination is also recorded as described above, is copied by the use of the conventional illegal copying method, the disk discrimination code ED cannot be copied.

To make exactly the same illegally copied disk as the compact disk 2, it is required to record the disk discrimination code ED in the same form of mark, and to do that a disk recording medium having a reflection recording film on which the digital audio signal D1 is recorded previously in the form of pit string must be used. Furthermore a unit having the same structure as that of the optical disk apparatus 1 must be used. As a result, the disk discrimination code ED is rendered difficult to be copied.

When the laser beam is irradiated onto the compact disk 2 (FIG. 10) manufactured as described above, in the compact disk player 30, the reproduction signal RF whose signal level is changed with time corresponding to the beam intensity of the reflected beam obtained by irradiating the laser beam onto the compact disk 2 is detected, thereby the signal level of the reproduction signal RF changes with time corresponding to the pit and land configuration and also corresponding to the reflectance of the compact disk 2, thereby the reproduction signal RF is binarized by the binarization circuit 35. Subsequently, the binary signal BD is binary-discriminated by the EFM demodulation circuit 37, and then subjected to EFM demodulation and interleave process and to error correction process carried out by the ECC circuit 38. And accordingly, the digital audio signal is reproduced. At that time, although the signal level near each pit edge changes slightly due to the existence of the mark because the mark is formed by locally changing the reflectance on the compact disk 2, the binary signal is correctly discriminated at a sufficiently practical accurate level to generate a clock and reproduced correctly due to the generated clock. Consequently, the compact disk 2 is reproduced correctly by the use of an ordinary compact disk player even when the disk discrimination code ED is recorded on this compact disk 2.

When in reproduction of the digital audio signal as described above, the disk discrimination code reproducing circuit 41 reproduces the disk discrimination code ED simultaneously from the compact disk 2. If the disk discrimination code ED is not reproduced correctly, then the disk is regarded as an illegally copied disk and the digital analog conversion circuit 39 is controlled to stop the digital analog conversion process immediately.

In detail, when in reproduction of the disk discrimination code ED (FIG. 11) recorded on the compact disk 2, the sync pattern detection circuit 45 detects the frame sync, and the M-series generation circuit 46 generates the M-series random number data MZ corresponding to the M-series random number data MS for recording with reference to the detected frame sync.

Furthermore, the edge detection circuit 44 detects the timing when the laser beam crosses a pit edge, and the sub-code detection circuit 42 detects the timing when the sub-code proceeds in seconds.

The analog digital conversion circuit 47 converts the reproduction signal RF to a digital reproduction signal and the selector 49 selects the digital reproduction signal or the digital signal whose polarity is inverted with reference to the M-series random number data MZ, thereby the reproduction data RX which expresses the logical level of the disk discrimination code ED in the from of multi-value data is reproduced.

When in reproduction of the compact disk 2, the accumulator 53 and adder 52 selectively accumulate the reproduction data RX corresponding to each pit edge in seconds while the subcode proceeds step by step. The SN ratio obtained by the reproduction result of the disk discrimination code ED is thereby improved. The binarization circuit 54 binarizes the accumulation result, thereby decoding the disk discrimination code ED, and then the disk discrimination code ED is subjected to error correction process carried out by the ECC circuit 55 and supplied to the system control circuit 40.

When in reproduction of the disk discrimination code ED, although the reflectance change of an edge is small, the disk discrimination code ED is obtained as a total of signals obtained from many pit edges. The disk discrimination code ED can be decoded sufficiently and consistently without any adverse effect of random noise on the disk. The adverse effect caused by the level fluctuation of the whole reproduction signal is avoided effectively. When the disk discrimination code ED is decoded according to the total, because the disk discrimination code ED is disturbed by the use of M-series during recording, it is possible to reproduce the disk discrimination code ED very stably.

(2-3) Effect of Another Embodiment

According to the configuration as described above, the laser beam is irradiated onto the compact disk, thereby changing the reflectance of the compact disk locally for forming a jitter and the disk discrimination code is recorded by the use of the jitter. The disk discrimination code is thus recorded so as to be reproduced by the optical pickup which reproduces the digital audio signal and not to be illegally copied without any adverse effect on the reproduction of the digital audio signal recorded in the form of pit strings.

Because 1 bit of the disk discrimination code is assigned to 1 second with reference to the sub-code and 1 bit of the disk discrimination code is assigned to at least 10 pit edges for recording, the disk discrimination code is reproduced consistently without any effect of noise on the reproduction.

Because the disk discrimination code is modulated with M-series random data for recording, the disk discrimination code is recorded so as not to be discriminated easily between noise and the disk discrimination code itself. It is thus difficult to find and analyze the disk discrimination code. In addition, the disk discrimination code is reproduced consistently without any effect of noise on the reproduction.

Because the signal level of the reproduction signal RF is detected to decode the disk discrimination code and the signal level is accumulated to remove the effect of noise mixed in the disk discrimination code in the compact disk player, the disk discrimination code ED which is recorded so as not to be discriminated from noise easily is reproduced consistently.

Because the selector 49 selectively processes the digital reproduction signal by the use of M-series random data MZ to reproduce the disk discrimination code, the disk discrimination code which is recorded so as not to be found nor analyzed is reproduced consistently.

(3) Further Another Embodiment

Although the case that the CD-R film structure is applied to the reflection recording film is described in the above-mentioned embodiment, the present invention is not limited only to the case; for example, the film structure of a phase change type optical disk may be applied, or this type of data may be additionally recorded on a conventional compact disk if it is possible to intermittently irradiate a laser beam with sufficiently high intensity.

Although the case that a mark is formed so as to cover astride a pit edge is described in the above-mentioned embodiment, the present invention is not limited only to the case; for example, this type of mark may be formed near the edge to obtain the same effect as obtained in the above-mentioned embodiment.

Although the M-series is reset in seconds in the above-mentioned embodiment, the present invention is not limited only to the case; for example, the M-series may be reset with each CD frame to obtain the same effect as obtained in the above-mentioned embodiment.

Although the disk discrimination code is recorded in the above-mentioned embodiment, the present invention is not limited only to the case; for example, various data required for decryption may be recorded if the digital audio signal which is encrypted according to the pit and land length is recorded, if the key information required for the encryption is recorded, or if the data required for a key information selection or decoding is recorded.

Although the disk discrimination code is recorded on a compact disk in the above-mentioned embodiment, the present invention is not limited only to the case; for example, the reproduction or copy count may be recorded in application to a compact disk player.

Although the value accumulated by the accumulator is subjected to binary discrimination to reproduce the disk discrimination code in the above-mentioned embodiment, the present invention is not limited only to the case; for example, the accumulated value may be subjected to multi-value discrimination for reproduction.

Although the EFM modulated digital audio signal is recorded in the above-mentioned embodiment, the present invention is not limited only to the case; for example, the present invention may be applied to various modulations such as 1-7 modulation, 8-16 modulation, and 2-7 modulation.

Although data is recorded in the form of pits and lands in the above-mentioned embodiment, the present invention is not limited only to the case; for example, the present invention may be applied widely to record the desired data in the form of marks and spaces.

Although the present invention is applied to a compact disk and its peripheral devices to record the audio signal in the above-mentioned embodiment, the present invention is not limited only to the case; for example, the present invention may apply widely to various optical disks such as a video disk and its various peripheral devices.

(4-1) Configuration in Further Another Embodiment

Figure 12:
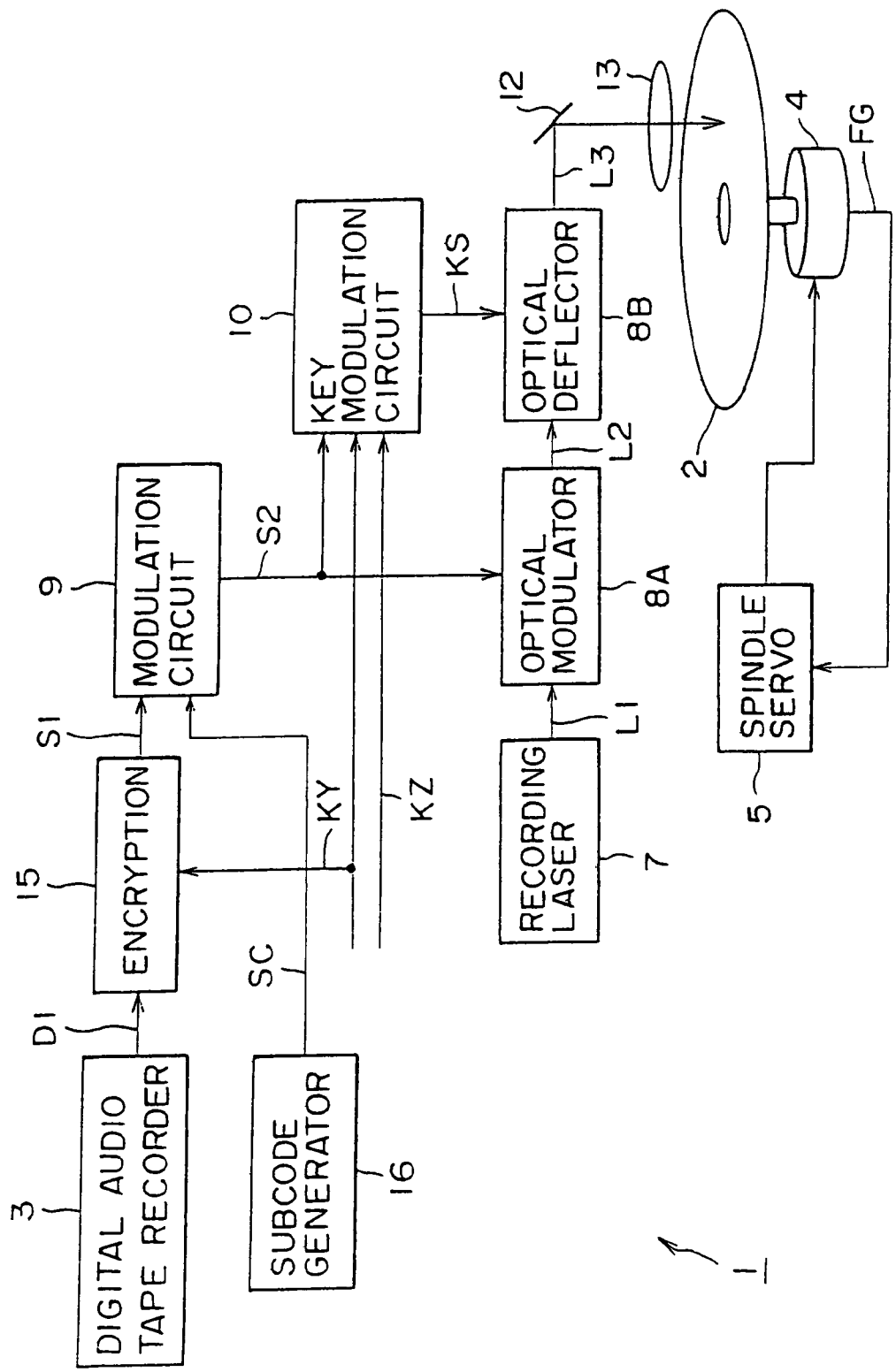
FIG. 12 is a block diagram of an optical disk apparatus used for creating an optical disk in accordance with an embodiment of the present invention.

FIG. 12 is a block diagram of the optical disk apparatus in further another embodiment of the present invention.

This optical disk apparatus 1 records audio data D1 by exposing a laser beam on a master disk 2. The audio data D1 is obtained from a digital audio recorder 3.

In detail, in the optical disk apparatus 1, a spindle motor 4 rotates the master disk 2 and an FG signal generation circuit held at the bottom of the spindle motor 4 outputs the FG signal FG whose signal level rises at each predetermined angle of rotation. A spindle servo circuit 5 controls the rotation speed of the spindle motor 4 according to the laser beam exposing position on the original disk 2 with reference to this FG signal, thereby rotating the disk 2 at a predetermined rotation speed.

A laser element 7 for recording comprises a gas laser element, etc. and irradiates a laser beam L1 to be exposed on the disk 2. An optical modulator 8A comprises, for example, an electric acoustooptic element. The optical modulator 8A subjects this laser beam L1 to on-off modulation according to the EFM (Eight to Fourteen Modulation) signal S2 output from the modulator 9 and outputs the modulated laser beam L2.

An optical deflector 8B comprises, for example, an electric acoustooptic element. The optical deflector 8B diffracts the laser beam L2 output from the optical deflector 8A according to the key modulation signal KS output from the key modulator 10, thereby changing the irradiation direction of the laser beam L2 towards the inner/outer region of the disk 2.

The mirror 12 folds the path of the laser beam L3 output from the optical deflector 10, thereby outputting the laser beam L3 towards the disk 2. The objective lens 13 converges the laser beam reflected from this mirror 12 on the recording face of the disk 2. Both the mirror 12 and the objective lens 13 are moved by a thread mechanism (not illustrated) step by step towards the outer region of the disk 2 from the inner region synchronously with the rotation of the disk.

Consequently, the optical disk apparatus 1 can deviates the focal point of the laser beam L3 step by step from the inner region to the outer region of the disk 2, thereby forming a spiral track on the disk 2. In addition, the optical disk apparatus 1 controls the on/off status of the laser beam L1 through the optical deflector 8A according to the EFM signal S2 in this track forming processing, thereby forming pit strings sequentially along the track. Furthermore, the optical disk apparatus 1 deviates the irradiation point of the laser beam L2 through the optical deflector 8B, thereby deviating each pit to the inner/outer region of the disk according to the key modulation signal KS.

In the optical disk apparatus 1, therefore, each pit is formed so as to minimize the deviation towards the inner/outer region of the disk 2 so that data is reproduced from an optical disk manufactured on the basis of this master disk by controlling the tracking under the same characteristics as those of the conventional compact disk player, that is, reproduction of recorded data is not disturbed by any pit string. More concretely, in this embodiment, the deviation of each pit to the inner/outer region of the disk is suppressed to not more than 1/50 of the track pitch even in the maximum deviation.

A digital audio tape recorder 3 outputs the audio data D1 to an encryption circuit 15. The encryption circuit 15 encrypts this audio data according to the DES (Data Encryption Standard) code with reference to the key information KY, then outputs the result.

A subcode generator 16 generates subcode data SC sequentially and outputs the generated data SC in a predetermined format for the compact disk. A modulation circuit 9 processes the output data S1 output from the encryption circuit 15, as well as the subcode SC, thereby generating an EFM signal S2 in the predetermined compact disk format. In detail, the modulation circuit 9 adds a correction code to both output data S1 output from the encryption circuit 15, as well as the subcode data SC, then interleaves and modulates the data so as to generate an EFM signal S2.

Consequently, in the optical disk apparatus 1, the audio data D1 can be encrypted and recorded in the form of pit strings on the original disk 2.

A key modulation circuit 10 generates a key modulation signal KS from the key information KY and outputs the result. Consequently, in the optical disk apparatus 1, the key information KY is recorded according to each bit which is deviated towards the inner/outer region of the disk. In this optical disk apparatus 1, the key information KY is generated by the read-only memory, etc.

Figure 13:
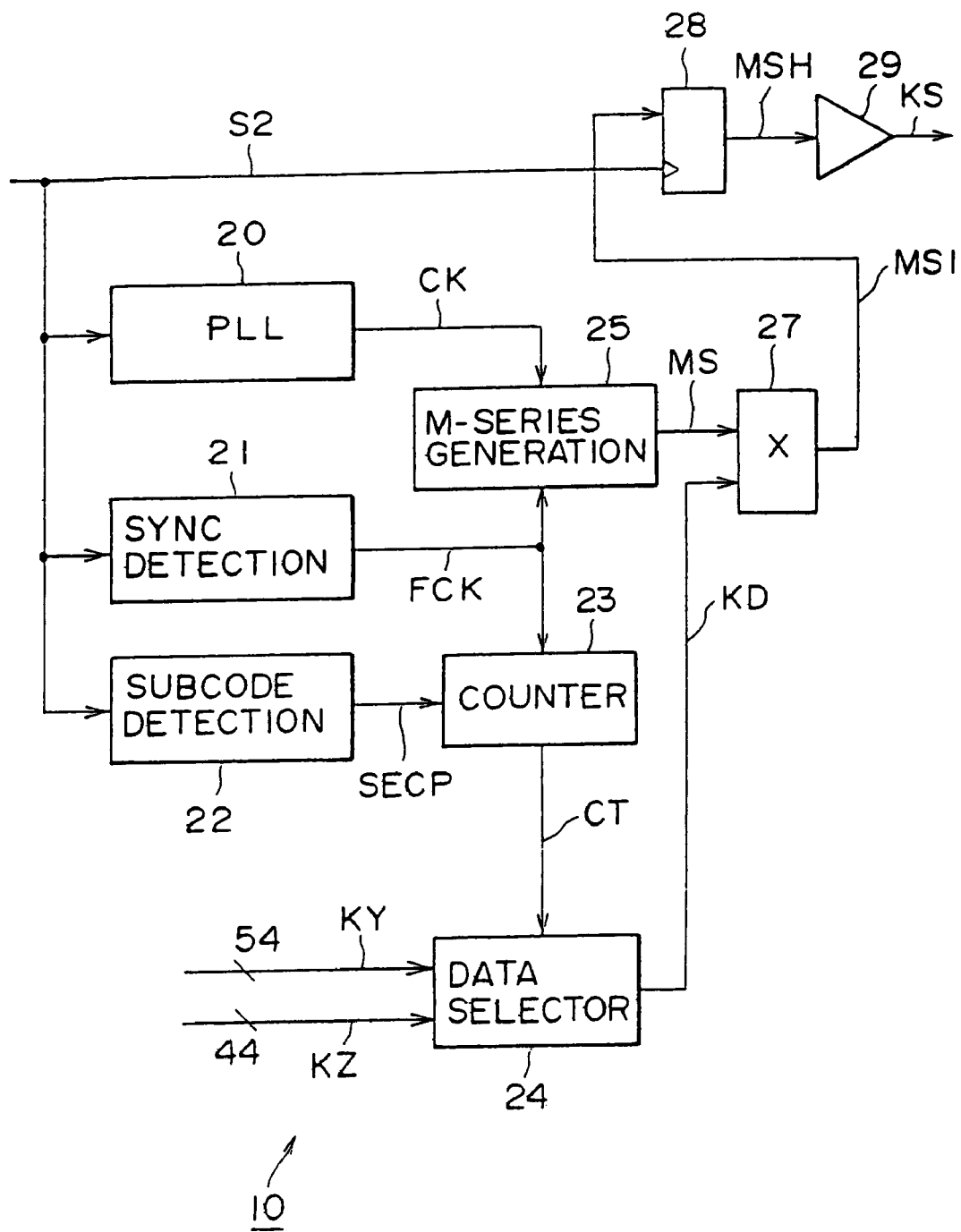
FIG. 13 is a block diagram of a key modulation circuit provided for the optical disk apparatus shown in FIG. 12.
Figure 14:
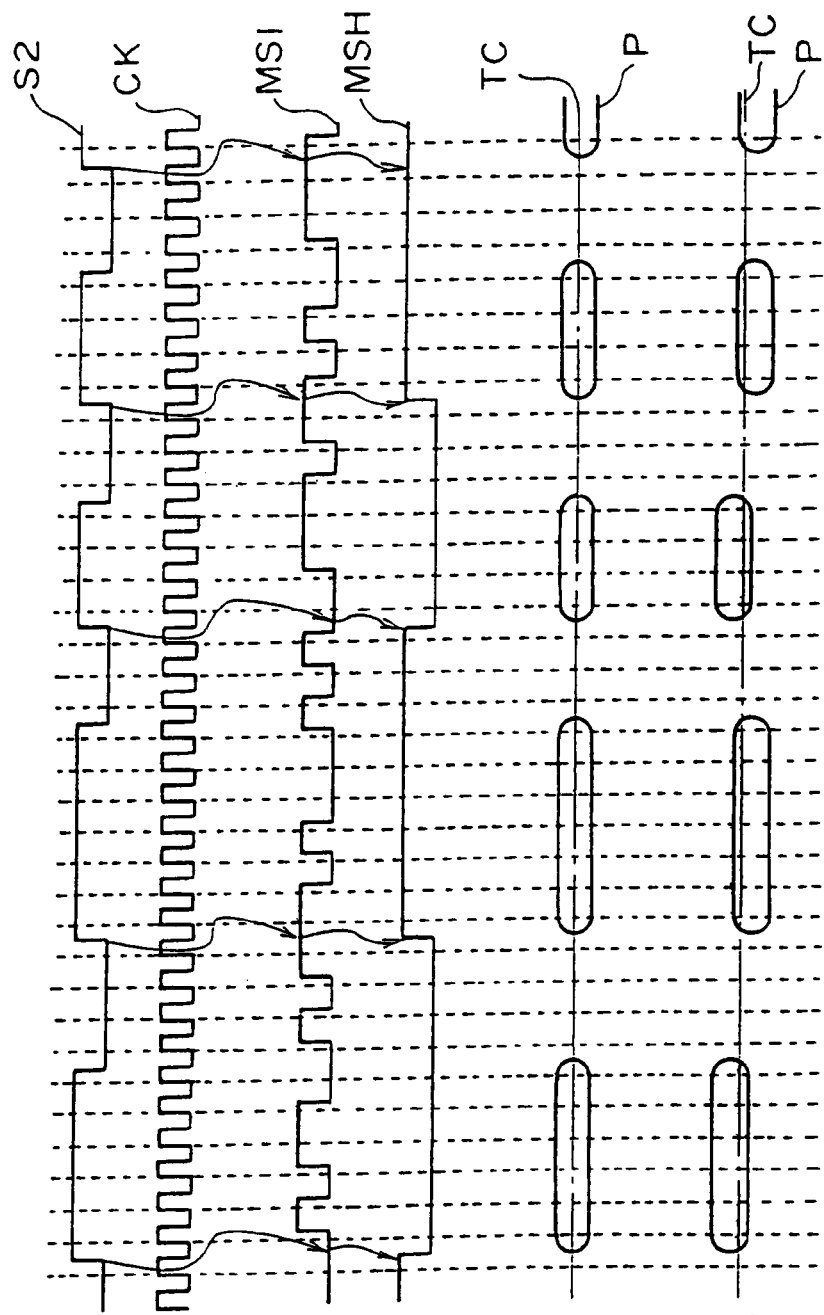

FIG. 13 is a detailed block diagram of this key modulation circuit 10. In the key modulation circuit 10, as shown in FIG. 14, the EFM signal S2 (FIG. 14A) is input to the PLL circuit (Phase Locked Loop) 20 and it reproduces the clock CK (FIG. 14B) from the EFM signal S2 there.

A sync detection circuit 21 latches the EFM signal S2 sequentially with reference to the clock CK and determines the continued logic level of the signal S2, thereby detecting a sync pattern from the EFM signal S2. The sync detection circuit 21 outputs the frame clock FCK whose logic level rises at each sync pattern. Consequently, in the format of the compact disk, a sync pattern is placed at the start of each frame and each frame comprises 588 channel clocks. Consequently, the sync detection circuit 21 comes to output the frame clock FCK whose logic level rises in units of 588 clocks.

A subcode detection circuit 22 monitors the EFM signal S2 with reference to the clock CK and demodulates a subcode according to the EFM signal S2. In addition, the subcode detection circuit 22 monitors the time information included in this demodulated subcode and outputs a 1-second detection pulse SECP whose signal level rises each time this time information is changed for one second. Consequently, 98 frames are assigned to one second in the format of the compact disk, thereby the subcode detection circuit 22 comes to output a 1-second detection pulse SECP so that its signal level rises in units of 98 pulses of the frame clock (FCK).

A counter 23 is a stepping counter for the frame clock FCK. If the 1-second detection pulse SECP rises, the counter value CT is reset. The counter 23 is composed as a ring counter which circulates the counter value CT in seconds. This counter value CT is changed synchronously with the frame clock FCK.

A data selector 24 outputs its held data according to the counter value CT of this counter 23, which is used as an address. The counter value CT of this counter 23 is changed cyclically in units of 98 frames per second synchronously with the sync pattern. The data selector 24 thus outputs 98 types of data one by one synchronously with the sync pattern used as the address obtained from the counter value CT. The counter value CT of the counter 23 is changed cyclically in seconds according to the 1-second detection pulse SECP, thereby the data selector 24 repeats the output of these 98 types of data cyclically in seconds.

In this embodiment, the data selector 24 outputs 98-bit data synchronously with the sync pattern by repeating the output of 1-bit data assigned to each of 98 types of data in seconds. In addition, each bit of the 54-bit key information KY is assigned to each predetermined bit of the 98-bit data and a meaningless bit is assigned to each of the remaining 44 bits. In this embodiment, data KZ whose value is fixed is assigned to such meaningless data.

The M-series generation circuit 25 comprises a plurality of flip-flop circuits and exclusive OR circuits connected serially respectively. The M-series generation circuit 25 sets an initial value in each of those flip-flop circuits according to the frame clock FCK. In addition, the M-series generation circuit 25 transfers such the set data one by one synchronously with the clock CK and generates M-series random number data MS in which logic levels 1 and 0 appear at the same probability because the values are fed back between predetermined stages. Consequently, the M-series generation circuit 25 outputs random number data MS, which is a binary series of a pseudo random number synchronized with the clock CK, so that the same pattern is repeated in one frame period, which is 588 clock cycles.

The exclusive OR circuit (X) 27 receives the random number data MS, as well as the output data KD from the data selector 24, then outputs a signal MS1 of the exclusive OR of the data MS and KD (FIG. 14C). In detail, the exclusive OR circuit 27 outputs the random number data MS as is if the logic value of the data KD output from the data selector 24 is 0 and outputs the random number data MS with an inverted logic level if the logic level is 1. Consequently, the exclusive OR circuit 27 can modulate the key information KY composing the output data KD with a random number and output the modulated key information.

The flip-flop circuit 28 latches the output data MS 1 from the exclusive OR circuit 27 with reference to the rising edge of the EFM signal S2 and outputs the latched data MS1 (FIG. 14D). In this embodiment, because the disk 2 is exposed to a laser beam according to this EFM signal S2, the scanning start edge in each pit corresponds to the rising edge of the EFM signal S2 on an optical disk manufactured on the basis of this master disk 2. Consequently, the flip-flop circuit 28 holds the logic level of the latched data MS1 within a period between when the data MS1 is output sequentially from the exclusive OR circuit 27 at the clock cycle which is a reference period for forming each pit and when the output data MS1 assigned to a timing for starting each pit is latched and the forming of at least one pit is finished. An amplifier circuit 29 is a driver amplifier for driving the optical deflector 8B and amplifies the output signal from the flip-flop 28 and outputs the amplified signal to the optical deflector 8B as a key modulation signal KS. Consequently, the amplification circuit 29 can deviate the irradiation point of the laser beam in bits towards the inner/outer region of the original disk 2. In the amplifier circuit 29, the gain is set so that this positional deviation is limited to not more than 1/50 of the track pitch in maximum. The optical disk apparatus 1 can thus be prevented from reproducing failures of data recorded in the form of pit strings. In this embodiment, therefore, the original disk 2 exposed to the laser beam such way is developed and treated for electroforming, thereby manufacturing a mother disk. This mother disk is then used to manufacture a stamper. In addition, this stamper is used to manufacture optical disks in the same way as the ordinary compact disk manufacturing process.

Consequently, in this embodiment, an optical disk can be manufactured so that audio data D1 encrypted in the form of pit strings is recorded and the key information KY is recorded with a deviation of each pit P towards the inner/outer region of the optical disk (FIG. 14E-2). In other words, in an ordinary compact disk, pits P are formed on the track center one by one along the track according to the EFM signal S2 10 and audio data is recorded according to the length of each pit and the interval between pits (FIG. 14E-1). On the contrary, in the case of the optical disk in this embodiment, audio data to be recorded is already encrypted according to the length of each pit and the interval between pits, and the key information KY for decrypting the encryption of this audio data is recorded according to the deviation of each pit towards the inner/outer region of the optical disk.

Figure 15:
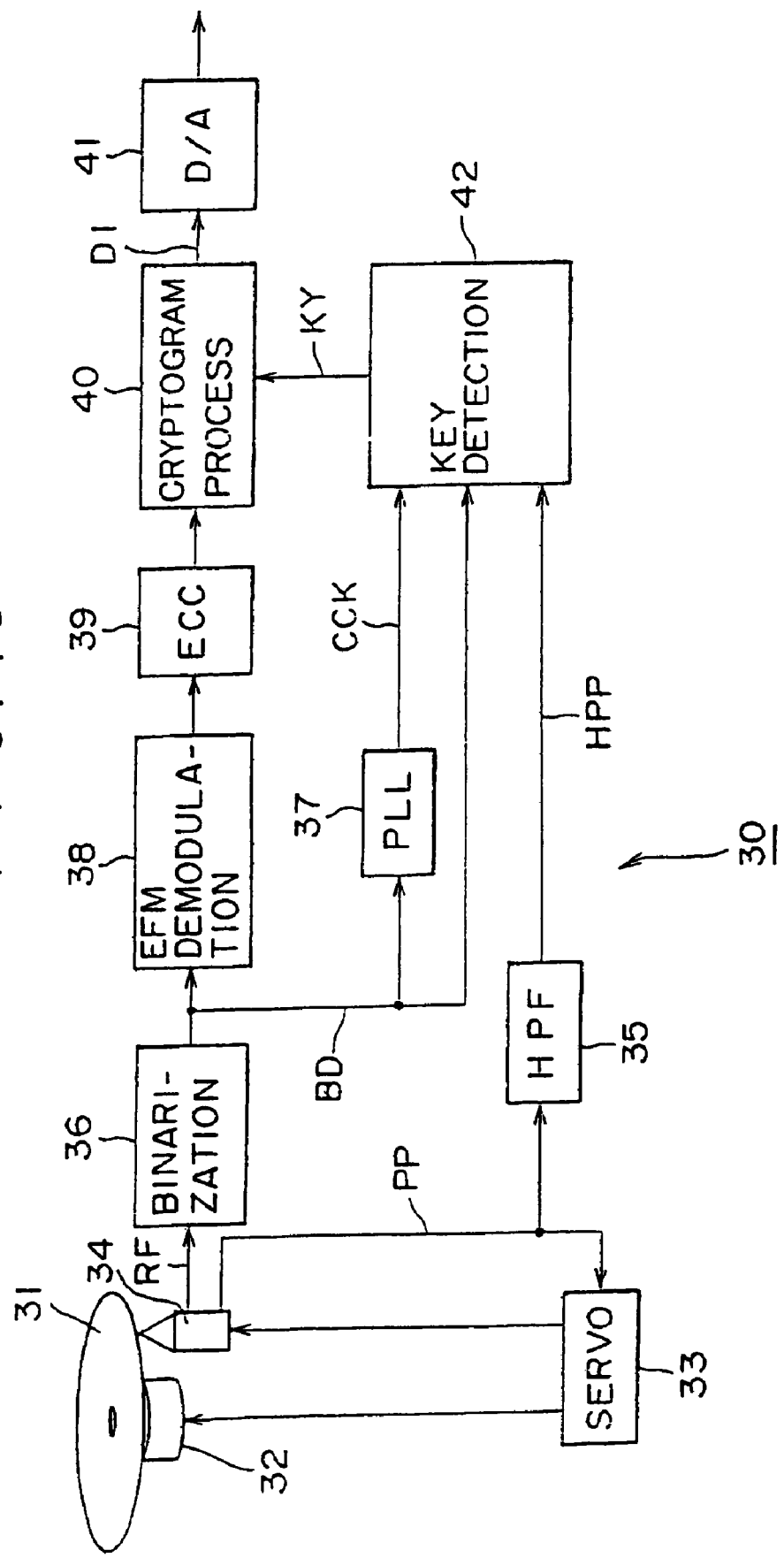
FIG. 15 is a block diagram of an optical disk apparatus for reproducing data from an optical disk created with the use of the optical disk apparatus shown in FIG. 12.

FIG. 15 is a block diagram of an optical disk apparatus 30 for reproducing data from an optical disk 31 manufactured as described above. In this optical disk apparatus 30, a spindle motor 32 rotates the optical disk 31 at a consistent linear speed under the control of a servo circuit 33. 20 An optical pickup 34 irradiates a laser beam on the optical disk 31 and receives the reflected laser beam at a predetermined beam reception element, then outputs a reproduction signal RF whose signal level is changed according to the intensity of the reflected laser beam at this reception element. The reproduction signal RF changes its level according to each pit recorded on the optical disk 31.

Furthermore, the optical pickup 34 processes the reflected laser beam which is received at the beam reception element with the use of a so-called push-pull method, thereby generating a push-pull signal PP whose signal level is changed according to the position of each pit with respect to the laser beam irradiation point at the inner/outer region of the optical disk 31. The optical pickup 34 outputs a focus error signal whose signal level is changed according to the amount of the focus error.

In the servo circuit 33, this push-pull signal PP is used to limit frequency bands, thereby generating a tracking error signal whose signal level is changed according to the deviation of the laser beam irradiation point from the track center. And, this tracking error signal is used to control the tracking of the optical pickup 34. The servo circuit 33 controls the focusing of the optical pickup 34 with the use of the focus error signal.

A high-pass filter (HPF) 35 cuts the low frequency components of the push-pull signal PP, thereby removing the deviation of the laser beam irradiation point from the track center from the push-pull signal PP whose signal level is changed according to the position of each pit from this track center. Consequently, the high-pass filter (HPF) 35 detects the deviation detection signal HPP whose signal level is changed according to the deviation of each pit from the track center.

A binary circuit 36 binarizes the reproduction signal RF at a predetermined reference level, thereby generating a binary signal BD.

A PLL circuit 37 operates with reference to this binary signal BD, thereby reproducing a channel clock CCK of the reproduction signal RF.

An EFM demodulation circuit 38 latches the binary signal BD sequentially with reference to the channel clock CCK, thereby reproducing the data corresponding to the EFM demodulation signal S2. In addition, the EFM demodulation circuit 38, after demodulating this reproduced data to EFM one, delimits this demodulated data in units of 8 bits with reference to the frame sync and deinterleaves each generated 8-bit signal and outputs the result to an ECC (Error Correcting Code) circuit 39.

The ECC circuit 39 corrects errors in this output data according to the error correcting code added to the output data from this EFM demodulation circuit 38, then reproduces encrypted audio data and outputs the reproduced data.

A cryptogram processing circuit 40 decrypts audio data according to the key information KY detected by the key detection circuit 42 and outputs the decrypted data.

A digital/analog conversion circuit (D/A) 41 converts digital audio data D1 output from this cryptogram processing circuit 40 to analog data and outputs analog audio data S4.

A key detection circuit 42 processes the deviation detection signal HPP with reference to the channel clock CCK and the binary signal BD, thereby reproducing the key information KY and outputting the reproduced data to the cryptogram processing circuit 40.

Figure 16:
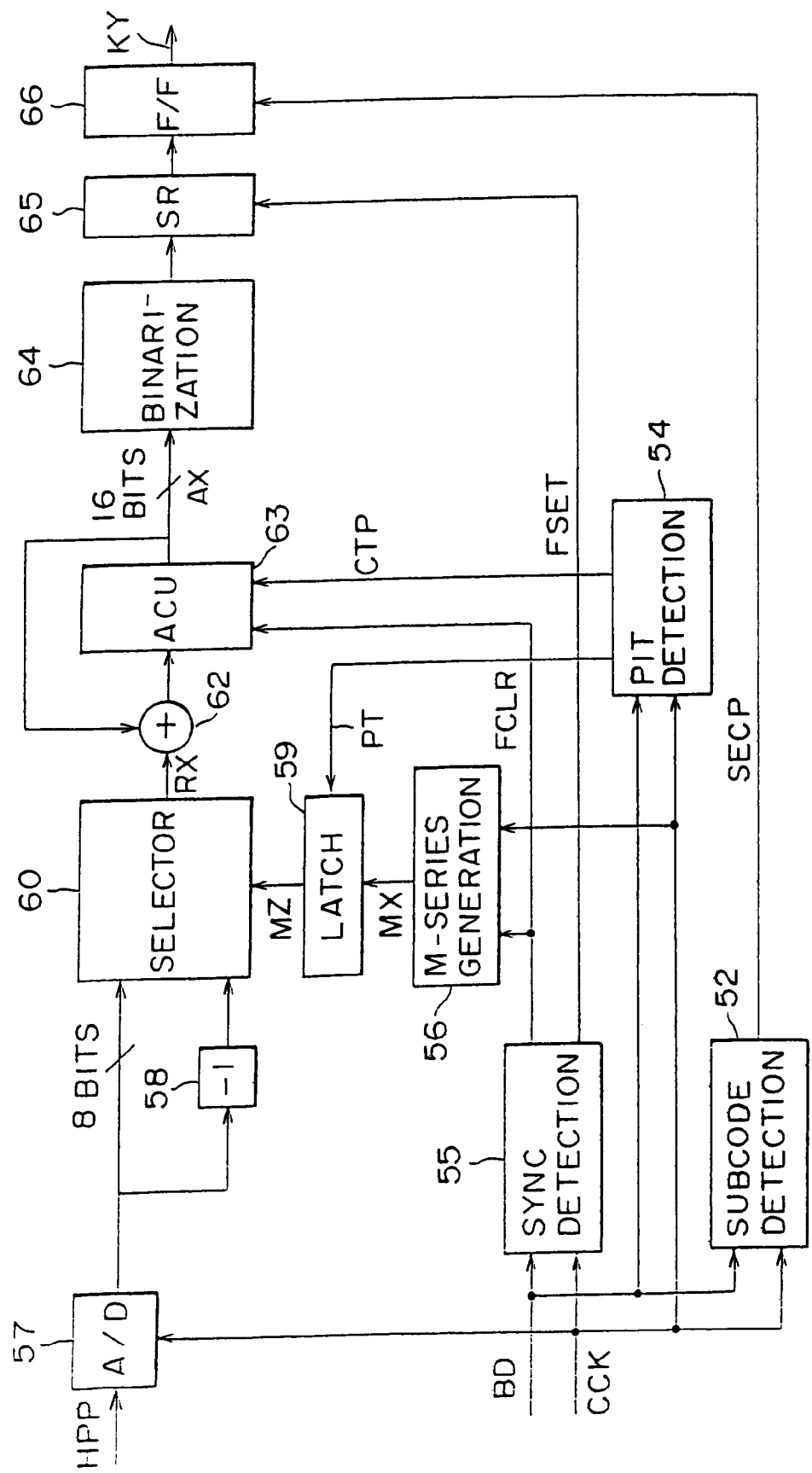
FIG. 16 is a block diagram of a key modulation circuit provided for the optical disk apparatus shown in FIG. 15.

FIG. 16 is a detailed block diagram of a key detection circuit 42. In the key detection circuit 42, a subcode detection circuit 52 monitors the binary signal BD with reference to the channel clock CCK and demodulates the subcode information from this binary signal BD. In addition, the subcode detection circuit 52 monitors the time information included in the demodulated subcode information and outputs a 1-second detection pulse SECP whose signal level rises each time this time information is kept changed for one second.

A pit detection circuit 54 latches the binary signal BD sequentially at the timing of the channel clock CCK and compares continuous two latched BD signals with each other, thereby detecting the pit rising timing according to the result of the comparison. The pit detection circuit 54 outputs an edge detection signal PT at the pit rising timing according to this result of comparison. The pit detection circuit 54 further detects the pit falling timing in the same way and outputs a center detection signal CTP around the center of each pit according to the detection result of the corresponding pit rising timing.

A sync detection circuit 55 latches the binary signal BD sequentially with reference to the channel clock CCK and determines the continued logic level of the binary signal BD, thereby detecting a sync pattern. Consequently, as shown in FIG. 17, the sync detection circuit 55 generates a set pulse FSET (FIGS. 17A3, 17B, and 17D) whose signal level rises only for one clock period at the sync pattern starting timing and a clear pulse FCLR (FIG. 17C) whose signal level rises with a delay of one clock cycle from this set pulse FSET and outputs those pulses.

Consequently, because a sync pattern is detected in units of 588 clock cycles and 98 times per second in the binary reproduction signal BD (FIGS. 17A1 and 17A2), the sync detection circuit 55 can output the clear pulse FCLR and the set pulse FSET synchronously with this sync pattern.

An M-series generation circuit 56 initializes each address with reference to the clear pulse FCLR, then accesses the built-in read-only memory address by address according to the channel clock CCK, thereby generating M-series random number data MX corresponding to the M-series random number data MS generated in the optical disk apparatus 1.

Consequently, the key detection circuit 42 can reproduce various reference signals necessary for reproducing the key information KY with respect to the processing carried out in the optical disk apparatus 1.

In the key detection circuit 42, an analog/digital (A/D) conversion circuit 57 converts the analog deviation detection signal HPP to a digital HPP signal with reference to the channel clock CCK, then outputs an 8-bit digital reproduction signal. A polarity inversion circuit (−1) 58 inverts the polarity of this digital reproduction signal and outputs the polarity-inverted signal.

A latching circuit 59 latches M-series random number data MX at a timing of the edge detection signal PT and holds this latched data MX within a time between when the exclusive OR circuit processes the data MX in the key modulation circuit 10 as described with reference to FIG. 13, that is, when forming of a pit is started, and when forming of the pit is completed.

A selector 60 selects the digital signal entered directly from the A/D conversion circuit 57 or the polarity-inverted digital signal entered from the polarity inversion circuit 58 according to the logic level of the output data MZ output from the latching circuit 59 and outputs the selected signal. In other words, the selector selects and outputs the digital signal entered directly when the logic level of the data MZ is 1 and the polarity-inverted digital signal when the logic level of the data MZ is 0. Consequently, this selector 60 comes to reproduce the logic level of the key information KY (KD) modulated with the M-series random number data MS with the use of multi-value data and outputs the data RX reproduced with the use of this multi-value data.

An adder 62 is a 16-bit digital adder and adds up the reproduced data RX and the output data AX output from the accumulator (ACU) 63 and outputs the total. The accumulator 63 comprises a 16-bit memory for holding the output data from the adder 62. The accumulator 63 feeds back its held data to the adder 62, thereby composing a cumulative adder together with the adder 62. In other words, the accumulator 63 clears itself with the clear pulse FCLR, then accumulates the output data from the adder 62 synchronously with the output signal CTP from the pit detection circuit 54.

Consequently, the adder 62 and the accumulator 63 are combined to add up or subtract the deviation value detected in the center of each pit according to the M-series random number data MS. This adding/subtracting processing is repeated for each frame period.

A binary circuit 64 binarizes the output data AX from the accumulator 63 according to a predetermined reference value and outputs the binarized data. Consequently, the binarization circuit 64 can convert the data RX reproduced from the key information KY (KD) with the use of a multi-value data reproduced by the selector 60 to binary data.

A shift register (SR) 65 is a 98-bit shift register. The shift register (SR) 65 receives binary data output from the binary circuit 64 sequentially at the set pulse FSET rising timing, then transfers the data.

A flip-flop circuit (F/F) 66 fetches data output from the shift register 65 in a bit-parallel manner at a timing of the 1-second detection pulse SECP and holds the data. Consequently, the flip-flop circuit 66 in the key detection circuit 42 can hold the data KD consisting of key information KY and fixed value data KZ. The key detection circuit 42 outputs a predetermined bit held in this flip-flop circuit 66 selectively, thereby supplying key information KY to the cryptogram processing circuit 40 and decrypting encrypted audio data.

(4-2) Operation in Further Another Embodiment

In the above configuration, the optical disk apparatus 1 (FIG. 12) exposes a laser beam on the original disk 2 in the manufacturing process of the optical disk 31 in this embodiment and this original disk 2 is developed and treated for electroforming, thereby manufacturing a mother disk. Then, this mother disk is used to manufacture a stamper and an optical disk.

When exposing a laser beam on this master disk 2, in the optical disk apparatus 1, the audio data D1 output from the digital audio tape recorder 3 is entered to the encryption circuit 15 and encrypted there with the use of predetermined key information KY. Consequently, the audio data D1 is processed so as not to be reproduced without this key information KY. After this, the audio data D1 is converted to an EFM signal S2 in the modulation circuit 9 in the same way as the conventional compact disk.

In the optical disk apparatus 1, this EFM signal S2 controls the on/off status of the laser beam L1 and this controlled laser beam L2 is converged sequentially from the inner region to the outer region of the master disk 2, thereby forming a spiral track on the object optical disk from the inner region to the outer region. The encrypted audio data D1 is thus recorded in the form of pit strings along this track.

While the audio data D1 is recorded in the form of pit strings such way, the key modulation circuit 10 in the optical disk apparatus 1 can modulate the key information KY so as not to be decrypted easily, thereby generating a key modulation signal KS. And, this key modulation signal KS drives the optical deflector 8B and deviates the focal point of the laser beam L3 towards the inner/outer region of the original disk 2. The key information KY is thus recorded according to the deviation of each pit towards the inner/outer region of the disk 2.

In this embodiment, therefore, it is possible to provide the audio data D1 encrypted so as not to be reproduced without the key information KY, as well as the key information KY recorded together on one medium.

The positional deviation of each pit formed as described above is limited to not more than 1/50 of the track pitch, thereby the pit is deviated cannot be recognized easily even by the use of a microscope. This makes it very difficult to analyze such the positional deviation of each pit, so that the optical disk can be protected effectively from illegal copying.

In addition, because the positional deviation is very small, reproduction signals can be reproduced surely with the margins enough in both phase and amplitude. The audio data D1 recorded in the form of pit strings can thus be reproduced certainly. Such the deviation of a pit towards the inner/outer region of the disk affects the controlling of the tracking some times, but such a small deviation of the pit in this embodiment never disturbs the accuracy of the tracking. Audio data recorded in the form of pits can thus be reproduced accurately enough for practical use.

In detail, the key information KY (FIG. 13), because 98 frames are assigned to one second on a compact disk, is set in the data selector 24 so that data KZ consisting of 44 meaningless fixed bits are added to the key information KY consisting of a 54-bit DES code when one bit data is assigned to each frame.

The key information KY(KD) set so that one bit is assigned to one frame is output from the data selector 24 so as to be circulated in seconds according to the sync pattern detected in the sync detection circuit 21 and the SECP detected in seconds in the subcode detection circuit 22.

At the same time, the M-series generation circuit 25 generates random number data MS, which is a binary series in which logic levels 1 and 0 appear at the same probability synchronously with the clock CK and repetitively in frames according to the FCK indicating a detected sync pattern.

The key information KY(KD) is output from the data selector 24 and modulated with random number data MS when the exclusive OR circuit 27 obtains an exclusive OR from between the key information KY(KD) and the random number data MS. At this time, because this random number data MS is a binary series in which logic levels 1 and 0 appear at the same probability, the modulated output data from the exclusive OR circuit 27 enables logic levels 1 and 0 to appear at almost the same probability. In the key modulation circuit 10, the output data MS1 generated such way is latched by the flip-flop 28 at the rising of the EFM signal S2, thereby one bit of the output data MS1 is assigned selectively in each pit formed on the original disk 2. And, according to the logic level of this one bit, the focal point of the laser beam L3 is deflected towards the inner/outer region of the disk 2 by the optical deflector 8B, so that the key information KY is recorded according to this deflection towards the inner/outer region of the disk 2.

In this embodiment, the key information KY(KD) is output from the data selector in units of a single bit per frame and this key information KY(KD) is modulated with random number data MS, thereby the pit P is deviated in position. On the optical disk, therefore, the pit P is deviated irregularly towards the inner/outer region of the optical disk 2.

In this embodiment, therefore, the bits of the key information KY(KD) are recorded in a plurality of pits in a distributed manner, so that it is very difficult to find the key information KY recorded in such pits deviated at random from the center of the track. More concretely, even when the data recording face of the optical disk is checked with a microscope, a bit string is just seen as if modulated with a noise, thus it is very difficult to find such the key information KY visually. Consequently, because one bit of the key information KY is assigned to the 588 channel clocks in this case, at least one bit of the key information KY comes to be recorded in not less than 50 pits in a distributed manner.

Furthermore, because logic levels 1 and 0 appear at the same probability in the random number data MS at this time, pits are also formed so as to be deviated towards the inner and outer regions from the track center at almost the same probability. And, because such the positional deviation of each pit is very small, the deviation of the pit is just recognized as a noise mixture when observing various signals obtained from the optical pickup with the use of a microscope. It is thus very difficult to check from the waveforms of those signals whether or not the key information KY exists. On the other hand, suck the deviation of each pit does not include any offset component which is a DC component. In addition, because the output data MS1 is latched by the flip-flop circuit 28 and each pit is deviated in position according to the data MS1, this deviation of the pit can be detected easily, although an extremely degraded SN is used for the detection. The SN is obtained by extracting the high band components from the push-pull signal PP for detecting the tracking error signal. Consequently, this optical disk can be protected from illegal copying while it is structured simply so as to reproduce the key information KY with the use of a conventional optical pickup.

More concretely, just like in the conventional compact disk player, the optical disk apparatus 30 manufactured as described above allows the reproduction signal RF to be binarized in the binarization circuit 36, then processed in the EFM demodulation circuit 38. Furthermore, the errors in the signal RF can be corrected in the following ECC circuit 39, thereby encrypted audio data is reproduced. In the following cryptogram processing circuit 40, audio data is decrypted according to the key information KY obtained separately, so that audio signals recorded in the form of pit strings can be reproduced as a sound through the D/A conversion circuit 41.

In the optical disk apparatus 30, the band of the push-pull signal PP obtained through the optical pickup 34 is limited by the high pass filter 35, thereby it is possible to detect the off-track-center detection signal HPP whose signal level is changed according to the deviation of each pit towards the inner/outer region of the optical disk 2 with a simple structure.

Furthermore, in the optical disk apparatus 30, this deviation detection signal HPP is processed by the key detection circuit 42, so that the key information KY can be reproduced.

In detail, in the key detection circuit 42, the deviation detection signal HPP is converted to a digital signal by the A/D conversion circuit 57 in channel clocks, then the polarity is inverted by the polarity inversion circuit 58.

These two types of digital signals are entered to the adder 62 selectively according to the output data MZ. The data MZ is generated as a result of the latching of the random number data MX by the latching circuit 59 corresponding to a pit with reference to the sync pattern of the binary signal BD. The digital signal selected and entered to the adder 62 such way is accumulated there with reference to the FCLR, which is a detected sync pattern.

In detail, when in recording, the output data from the A/D conversion circuit 57 is added or subtracted according to the logic level of the output data from the exclusive OR circuit 27 (FIG. 13) at the rising timing of the EFM signal S2, and the accumulated value AX which is a result of addition or subtraction is accumulated in the accumulator 63 for each frame. In addition, the accumulated value AX in this accumulator 63, which is a binary discrimination result, is fetched into the shift register 65 when a sync pattern is started, thereby the key information KY is demodulated.

Consequently, because the deviation of each pit is so small and the deviation detection signal HPP obtained from each pit is accumulated for one frame such way so as to be subjected to binary discrimination even with an extremely degraded S/N ratio, the key information KY can be reproduced after the binary discrimination with a high S/N ratio. The key information KY can thus be reproduced certainly, while it is recorded so as not to be found easily.

In the key detection circuit 42, the accumulator 63 fetches data from the adder 62 corresponding to the center of each pit when the circuit 42 accumulates the signal level of the deviation detection signal HPP. Consequently, the signal level of the deviation detection signal HPP is accumulated at a stable timing, thereby the key detection circuit 42 is much more improved for the detection accuracy.

Illegal copying from the master optical disk 2 described above might also be done by controlling the on/off status of the laser beam with the use of the binary signal BD output from the binary circuit 36. In such the illegal copying, however, it is very difficult to record the key information KY depending on the disposition of each pit deviated from the track center. This makes it very difficult to copy the master disk 31 illegally in this embodiment.

In the case that audio data is reproduced from an optical disk copied illegally by copying only the pit strings such way, the key information KY recorded according to the pits deviated from the track center will not be copied, so that audio signals are output just like an encrypted noise. The recorded music, therefore, will not be reproduced normally, thereby the illegally copied optical disk becomes useless, thus illegal copying is prevented.

In this embodiment, therefore, key information can be recorded so as be reproduced with an optical pickup for reproducing audio data and not to be copied illegally without any adverse effect on reproduction of audio data recorded in the form of pit strings.

(4-3) Effect of Further Another Effective Embodiment

According to the configuration of the optical disk apparatus as described above, because key information is recorded in the form of pits so as to be deviated from the track center towards the inner/outer region of the disk, key information can be recorded so as be reproduced with an optical pickup for reproducing audio data and not to be copied illegally without any adverse effect on the reproduction of the audio data recorded in the form of pit strings. Consequently, the audio data encrypted with this key information can be recorded in the form of pit strings so as to be protected from illegal copying effectively.

In addition, because key information is modulated with a binary series before it is recorded, it is difficult to find such the key information recorded in the form of pits deviated from the track center and it is effectively prevented from illegal copying.

In addition, because an M-series random numbers causing logic levels 1 and 0 to appear at the same probability is employed for the binary series, output signals from the optical pickup are observed like a noise mixture, thereby the recorded key information cannot be found easily and protected effectively from illegal copying.

This embodiment also makes it possible to assign one bit of the key information to at least 50 pits and to dispose these pits so as to be deviated from the track center very slightly, thereby the recorded key information can be reproduced certainly.

In detail, the logic level of a binary series is referenced to integrate the signal level of the deviation detection signal. It is thus possible to reproduce the key information recorded so as to be deviated very slightly from the track center.

In addition, because the deviation of each pit from the track center is limited to not more than 1/50 of the track pitch, it is difficult to find the key information recorded in the form of pits deviated such way slightly.

(5) Further Another Embodiment

Although one bit of key information is assigned to one frame in the above embodiment, the present invention is not limited only to the case; for example, a plurality of bits of the key information may be assigned to one frame and furthermore, one bit of the key information may be as signed to a plurality of frames. And, instead of the assignment of such key information bits with reference to a frame of audio data, one bit of key information may be assigned with reference to the number of pits.

Although one bit of key information is recorded in not less than 50 pits in a distributed manner by assigning one bit of the key information to one frame in the above embodiment, the present invention is not limited only to the case; for example, the number of pits to be assigned to one bit may be varied as needed. As a result of testing, it is found that key information can be reproduced at an S/N ratio satisfactorily enough for practical use if one bit of key information is assigned to not less than 20 pits.

Although key information is recorded with the use of added meaningless fixed bits in the above embodiment, the present invention is not limited only to the case; for example, an error correcting code and/or copyright data, etc. may be added to the key information to be recorded.

Although encrypted data is recorded in the form of pit strings and key information required for decrypting data is also recorded in the form of pits deviated from the track center towards the inner/outer region of the disk in the above embodiment, the present invention is not limited only to the case; for example, the key information may be replaced with another kind of data such as discrimination data for whether to enable or disable copying.

Although the accumulated value in the accumulator is subjected to binary discrimination, thereby reproducing the key information in the above embodiment, the present invention is not limited only to the case; for example, this accumulated value may be subjected to multi-value discrimination. In this case, multi-value data can be recorded in pits deviated from the track center.

Although digital audio signals are modulated to EFM signals before they are recorded in the above embodiment, the present invention is not limited only to the case; for example, the digital audio signals may be modulated in various modulations such as 1-7, 8-1, 2-7 modulations.

Although key information is recorded on the entire surface of the optical disk in the above embodiment, the present invention is not limited only to the case; for example, the key information may be recorded only in such a limited region as a lead-in area.

Although desired data is recorded in the form of pit strings in the above embodiment, the present invention is not limited only to the case; for example, desired data may be recorded in the form of mark strings.

Although the present invention applies to an optical disk for recording audio data and its peripheral devices, thereby recording audio signals, the present invention is not limited only to the case; for example, the present invention may apply to various types of optical disks such as a video disk, as well as its peripheral devices.

As described above, according to the optical disk apparatus in this embodiment, the worth of each pirated version optical disk can be degraded significantly even when any of the above methods is used, thereby the popularization of such pirated version optical disks can be prevented.

Furthermore, according to the present invention, because the reflectance of the optical disk is locally changed to give a jitter to each edge position information and desired data is additionally recorded by the use of the jitter, such data as disc discrimination code is recorded without any adverse effect on the reproduction of the data string recorded in the form of pit strings so as to be reproduced by the optical pickup which is served for reproducing the data strings and so as not to be copied illegally.

Furthermore, according to the present invention, because such subdata as key information is recorded in the form of pits deviated from the track center towards the inner/outer region of the optical disk, various data can be recorded so as to be produced with an optical pickup for reproducing data strings recorded in the form of pit strings and not to be copied illegally depending on the copying method.

The invention claimed is:

1. A data reproducing apparatus comprising:
   an optical pickup device including
   a laser beam irradiation unit configured to illuminate pit strings or mark strings with a laser beam, said pit strings or mark strings corresponding to main data and being deviated in a radial direction from a track center of a track on an optical disc according to a sub signal that is generated from a binary number series, and
   a light detector configured to detect a presence or absence of pits or marks from light reflected from said laser beam irradiation unit; and
   a detection unit configured to detect main data and ID Information from a detection result of said light detector wherein said sub signal is generated from both said ID information and the binary number series.

2. A data reproducing apparatus in accordance with claim 1, wherein said binary number series includes logic levels 1 and 0 produced at substantially a same probability.

3. A data reproducing apparatus in accordance with claim 1, wherein:
   said binary number series is a binary random number series; and
   said ID Information is generated using said binary random number series.

4. A data reproducing method comprising steps of:
irradiating a main track and lateral deviated positions in a radial direction relative to said main track;
receiving reflected light from pit strings or mark strings along said main track and the lateral deviated positions;
detecting main data from said reflected light; and
detecting ID Information from a portion of the pit strings or mark strings by an amount of deviation of the pit strings or mark strings according to sub data, wherein said sub data is generated from both a binary number series and said ID Information.

5. A data reproducing method in accordance with claim 4, wherein said ID Information is generated from a binary number series such that logic levels 1 and 0 of said binary number series are produced at substantially a same probability.

6. A data reproducing method in accordance with claim 4, wherein said ID Information is generated from a binary number series as a binary random number series that is used to generate said binary random number series.

7. An information processing device comprising:
an optical pickup device including
a laser beam irradiation unit configured to illuminate pit strings or mark strings with a laser beam, said pit strings or mark strings being positionally deviated in a radial direction from a track center of a track on an optical disc according to a sub signal according to a binary number series, and
a light detector configured to detect a presence or absence of pits or marks from light reflected from said laser beam irradiation unit;
a main data detection unit configured to detect main data from a detection result of said light detector;
a processor configured to detect ID information based on said positional deviation of said pit strings or said mark strings; and
an output configured to output at least one of said main data and said ID Information wherein said sub signal is generated from both said ID Information and the binary number series.

8. An information processing device in accordance with claim 7, wherein
said binary number series includes logic levels 1 and 0 produced at substantially a same probability.

9. An information processing device in accordance with claim 7, wherein:
said binary number series is a binary random number series; and
said ID Information is generated using said binary random number series.

10. A data reproducing device comprising:
a receiving unit configured to receive a signal from a light detector and detect pit strings or mark strings that are deviated in a radial direction from track center on an optical disc according to a sub signal that is generated from ID information and a binary number series;
a binary number series generator configured to generate the binary number series; and
an ID information generator configured to generate ID information from said signal received by said receiving unit by using the binary number series.

* * * * *